US009514384B2

(12) United States Patent
Ishihara et al.

(10) Patent No.: US 9,514,384 B2
(45) Date of Patent: Dec. 6, 2016

(54) IMAGE DISPLAY APPARATUS, IMAGE DISPLAY METHOD AND STORAGE MEDIUM STORING IMAGE DISPLAY PROGRAM

(71) Applicant: FUJITSU LIMITED, Kawasaki-shi, Kanagawa (JP)

(72) Inventors: Masaki Ishihara, Kawasaki (JP); Yuji Matsuda, Kawasaki (JP); Masahiko Sugimura, Kawasaki (JP); Susumu Endo, Kawasaki (JP); Takayuki Baba, Kawasaki (JP); Yusuke Uehara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/636,647

(22) Filed: Mar. 3, 2015

(65) Prior Publication Data

US 2015/0310610 A1    Oct. 29, 2015

(30) Foreign Application Priority Data

Apr. 28, 2014 (JP) ................................. 2014-092758

(51) Int. Cl.
| | | |
|---|---|---|
| G06T 7/00 | (2006.01) | |
| G06K 9/62 | (2006.01) | |
| G06T 1/20 | (2006.01) | |
| G06F 17/30 | (2006.01) | |

(52) U.S. Cl.
CPC ....... *G06K 9/6201* (2013.01); *G06F 17/30274* (2013.01); *G06K 9/6204* (2013.01); *G06T 1/20* (2013.01); *G06T 7/0028* (2013.01); *G06K 2209/051* (2013.01); *G06T 2207/10081* (2013.01); *G06T 2207/20104* (2013.01); *G06T 2207/30004* (2013.01)

(58) Field of Classification Search
None
See application file for complete search history.

(56) References Cited

U.S. PATENT DOCUMENTS

| | | | |
|---|---|---|---|
| 2003/0063788 A1* | 4/2003 | Boland | ................. G06T 7/0012 382/132 |
| 2008/0304621 A1 | 12/2008 | Huber | |
| 2013/0208855 A1* | 8/2013 | Kimoto | ................. A61B 6/461 378/19 |

FOREIGN PATENT DOCUMENTS

| | | |
|---|---|---|
| JP | 60-159972 | 8/1985 |
| JP | 8-103439 | 4/1996 |
| JP | 2008-510247 | 4/2008 |
| JP | 2012-095791 | 5/2012 |
| WO | 2006/018816 | 2/2006 |

\* cited by examiner

*Primary Examiner* — Michelle Chin
(74) *Attorney, Agent, or Firm* — Fujitsu Patent Center

(57) ABSTRACT

An image display apparatus includes a display device and a computer configured to execute a program to cause the computer to serve as a display controlling part. The display part displays a first CT image and a second CT image simultaneously. The first CT image and the second CT image represent the same object but taken in different time periods. The display controlling part performs: displaying the first and second CT images simultaneously on the display device according to a first display mode; determining a target portion designated in the first CT image; and changing a display mode of a corresponding portion of the second CT image from the first display mode into a second display mode, the corresponding portion corresponding to the target portion designated in the first CT image.

15 Claims, 17 Drawing Sheets

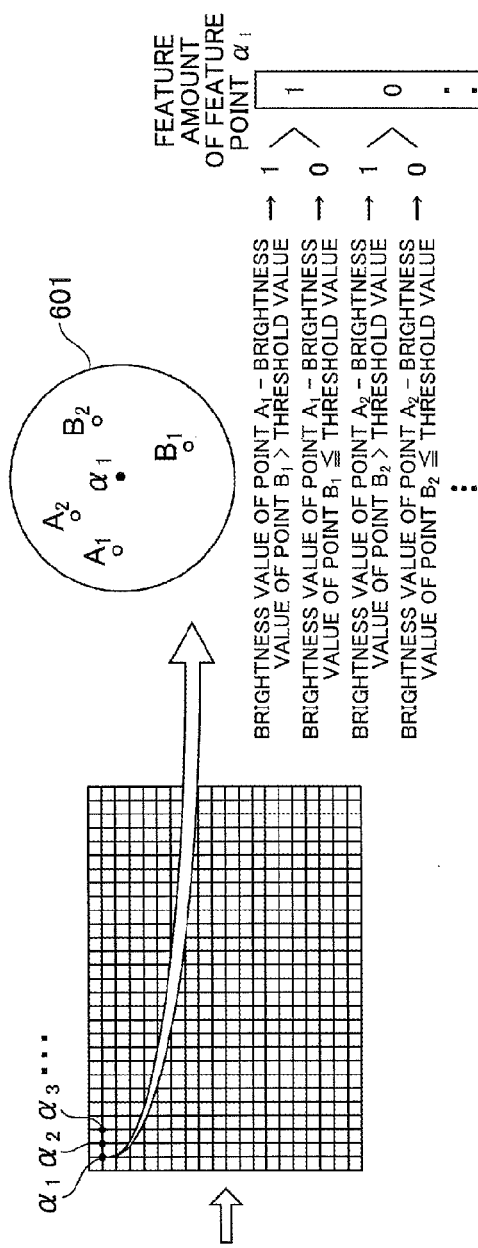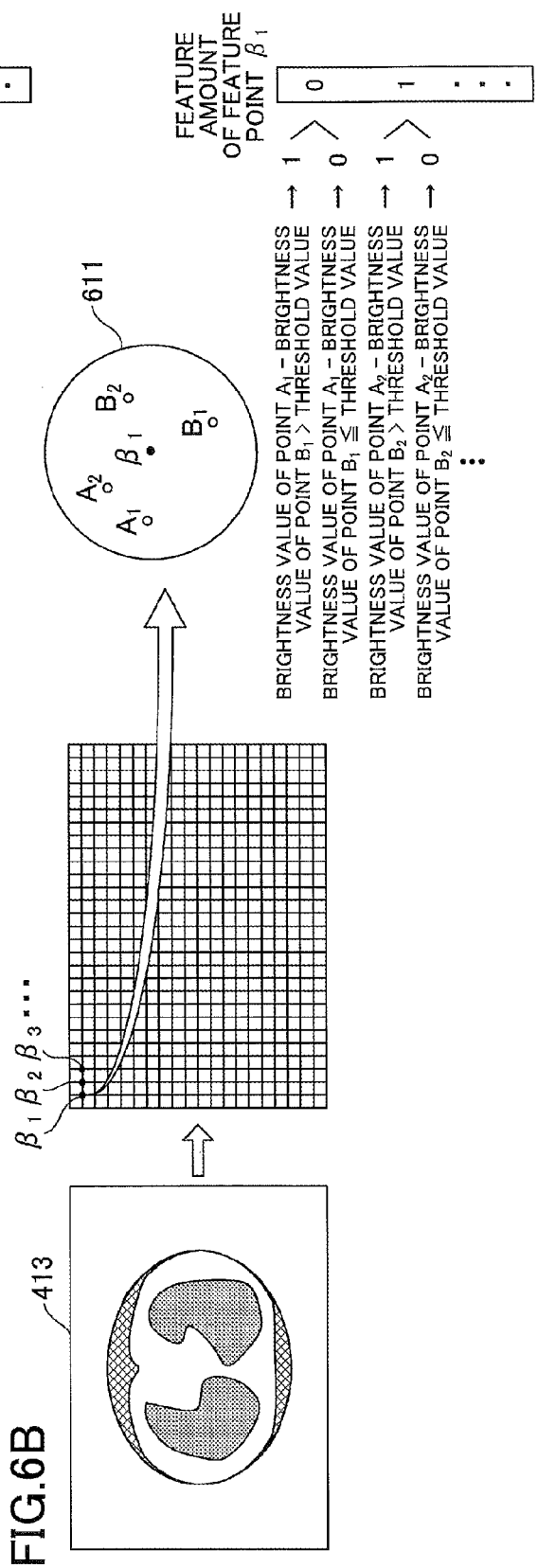

FIG.8A

COMPARISON SOURCE CT IMAGE — 800

| FEATURE POINT | FEATURE AMOUNT |
|---|---|
| $\alpha_1$ | 101011011 ········· 001 |
| $\alpha_2$ | 010100011 ········· 110 |
| $\alpha_3$ | NONE |
| $\alpha_{M-1}$ | 110101011 ········· 111 |
| $\alpha_M$ | 101010010 ········· 011 |

FIG.8B

COMPARISON TARGET CT IMAGE — 810

| FEATURE POINT | FEATURE AMOUNT |
|---|---|
| $\beta_1$ | 111001001 ········· 001 |
| $\beta_2$ | 110101010 ········· 110 |
| $\beta_3$ | 110100010 ········· 100 |
| $\beta_{M-1}$ | NONE |
| $\beta_M$ | 101010010 ········· 011 |

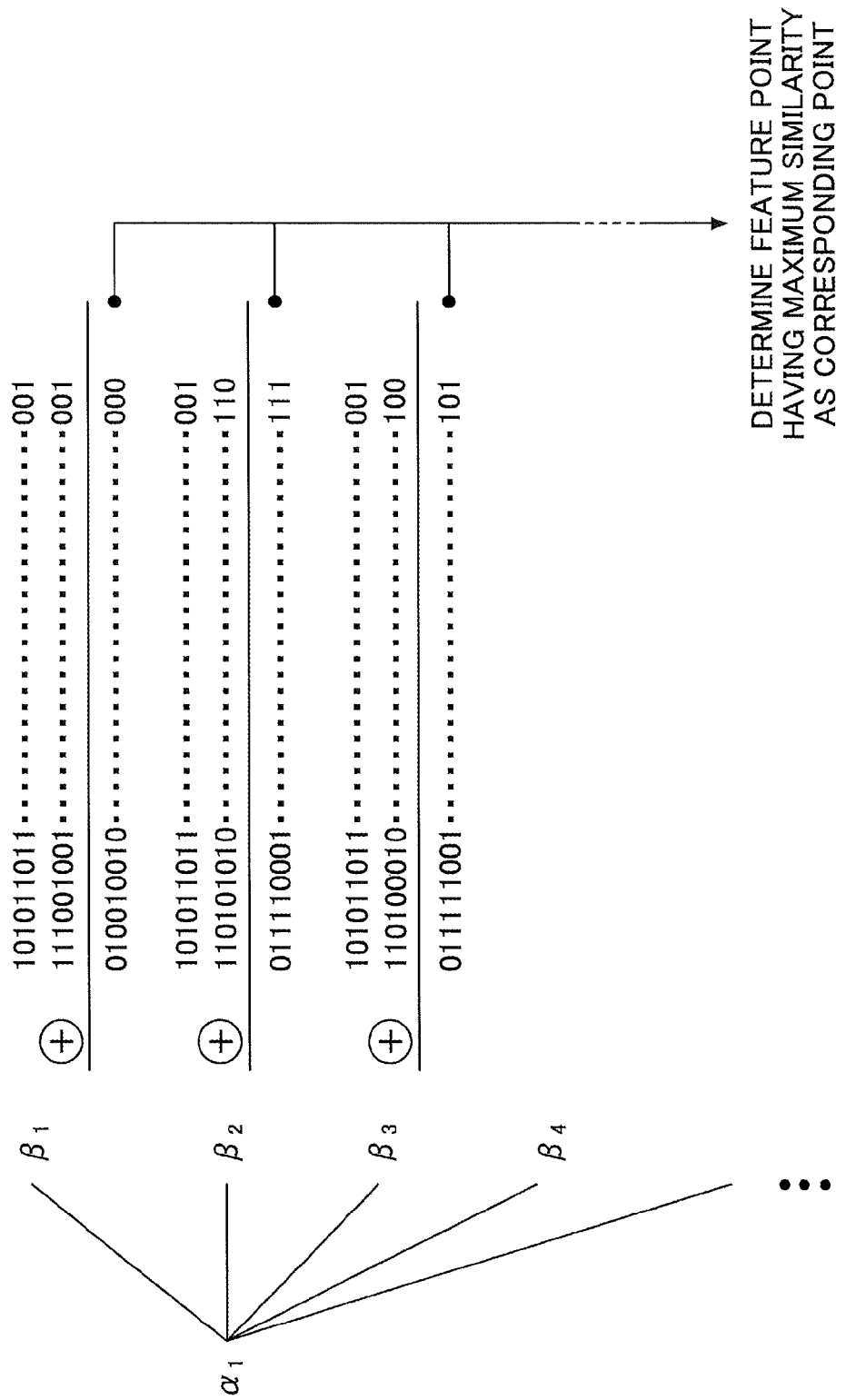

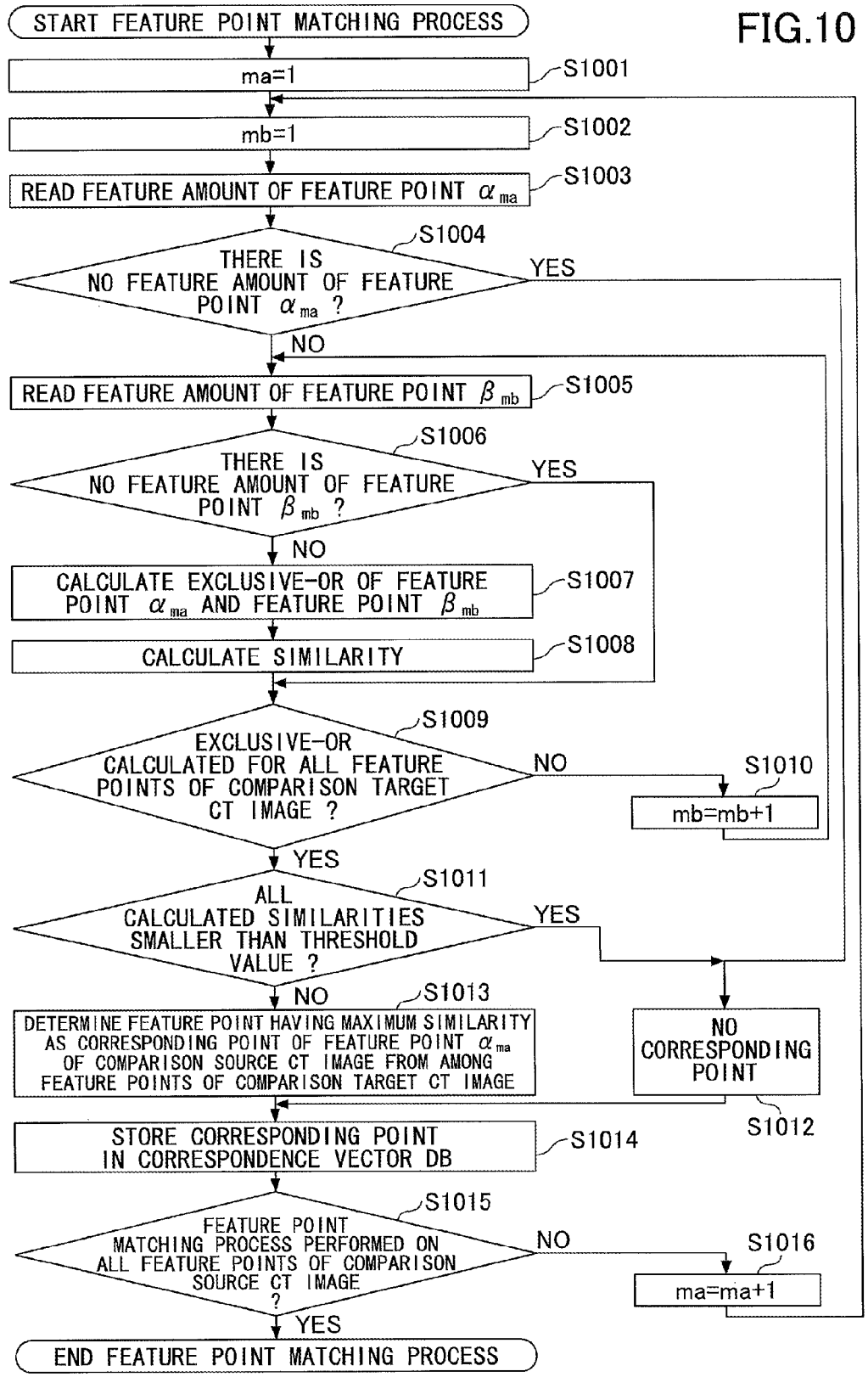

FIG.11
| COMPARISON SOURCE CT IMAGE | COMPARISON TARGET CT IMAGE |
|---|---|
| FEATURE POINT | FEATURE POINT |
| $\alpha_1$ | $\beta_1$ |
| $\alpha_2$ | $\beta_2$ |
| $\alpha_3$ | NONE |
| $\alpha_{M-1}$ | NONE |
| $\alpha_M$ | $\beta_M$ |
FIG.12A
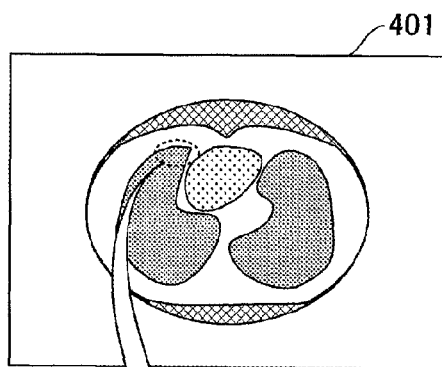
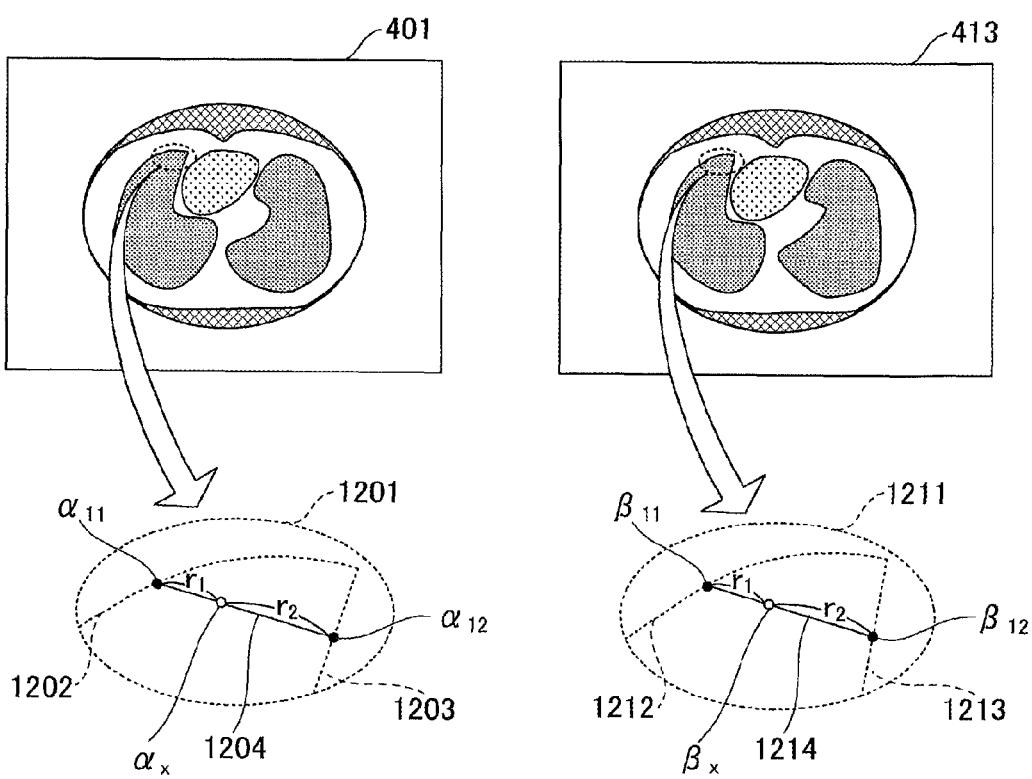
FIG.12B
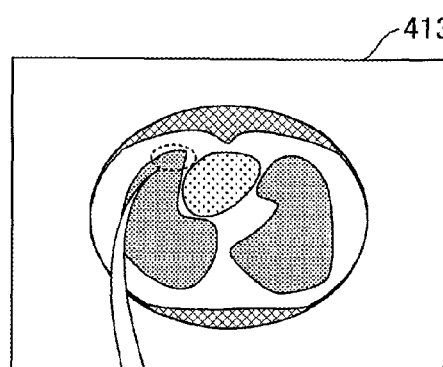
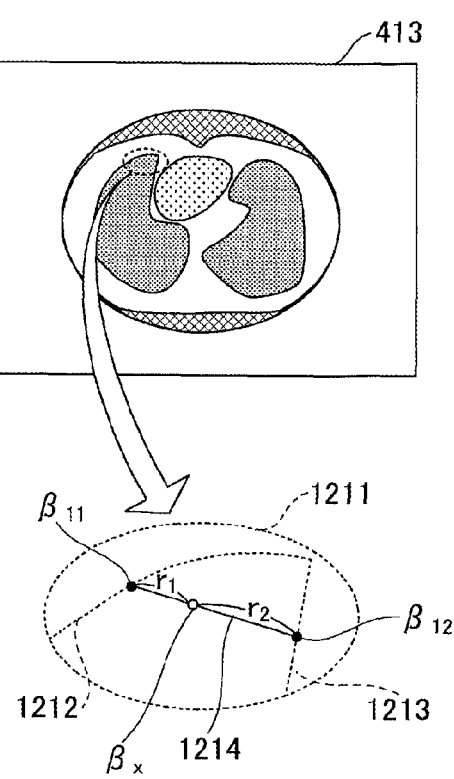

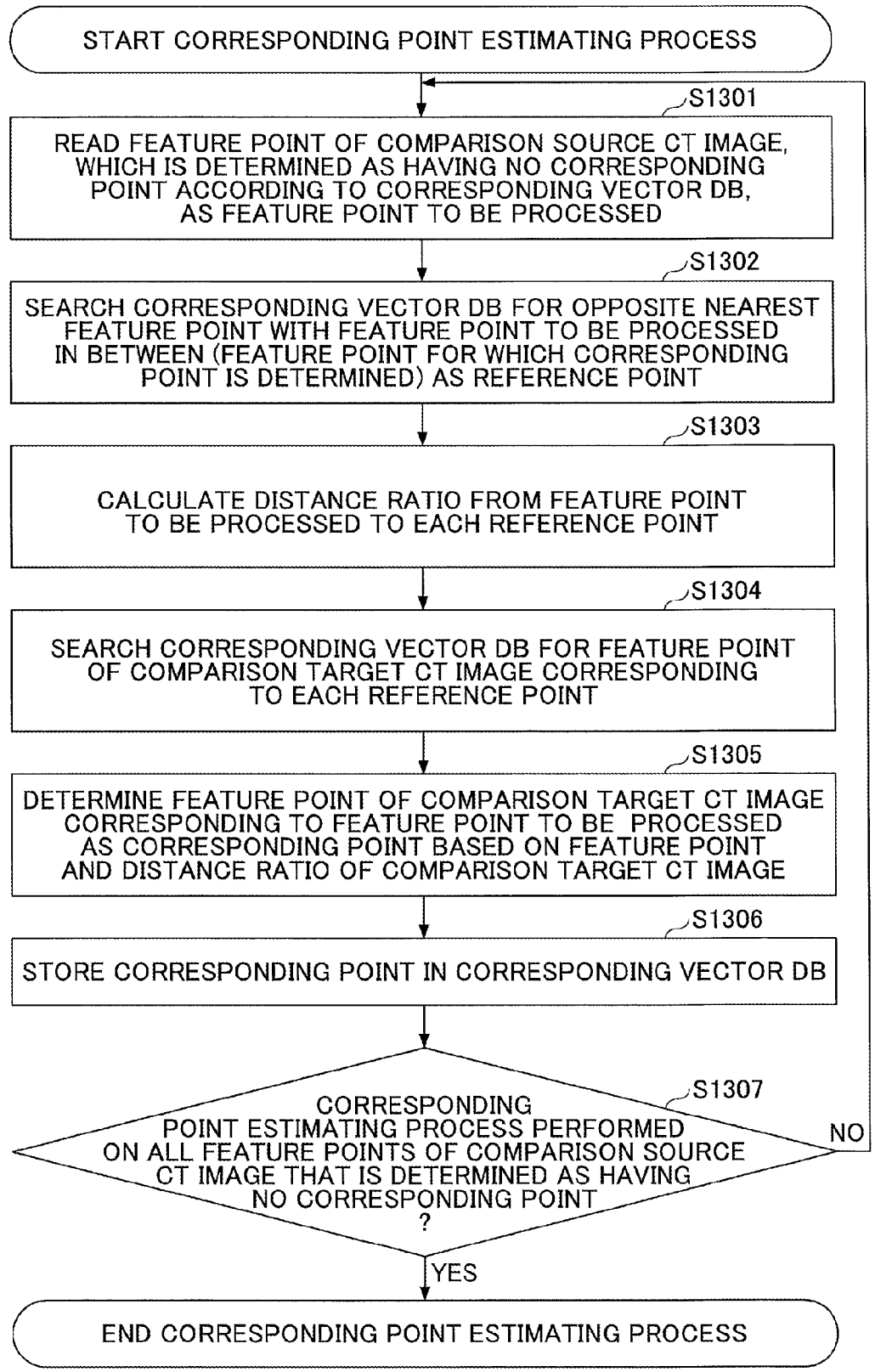

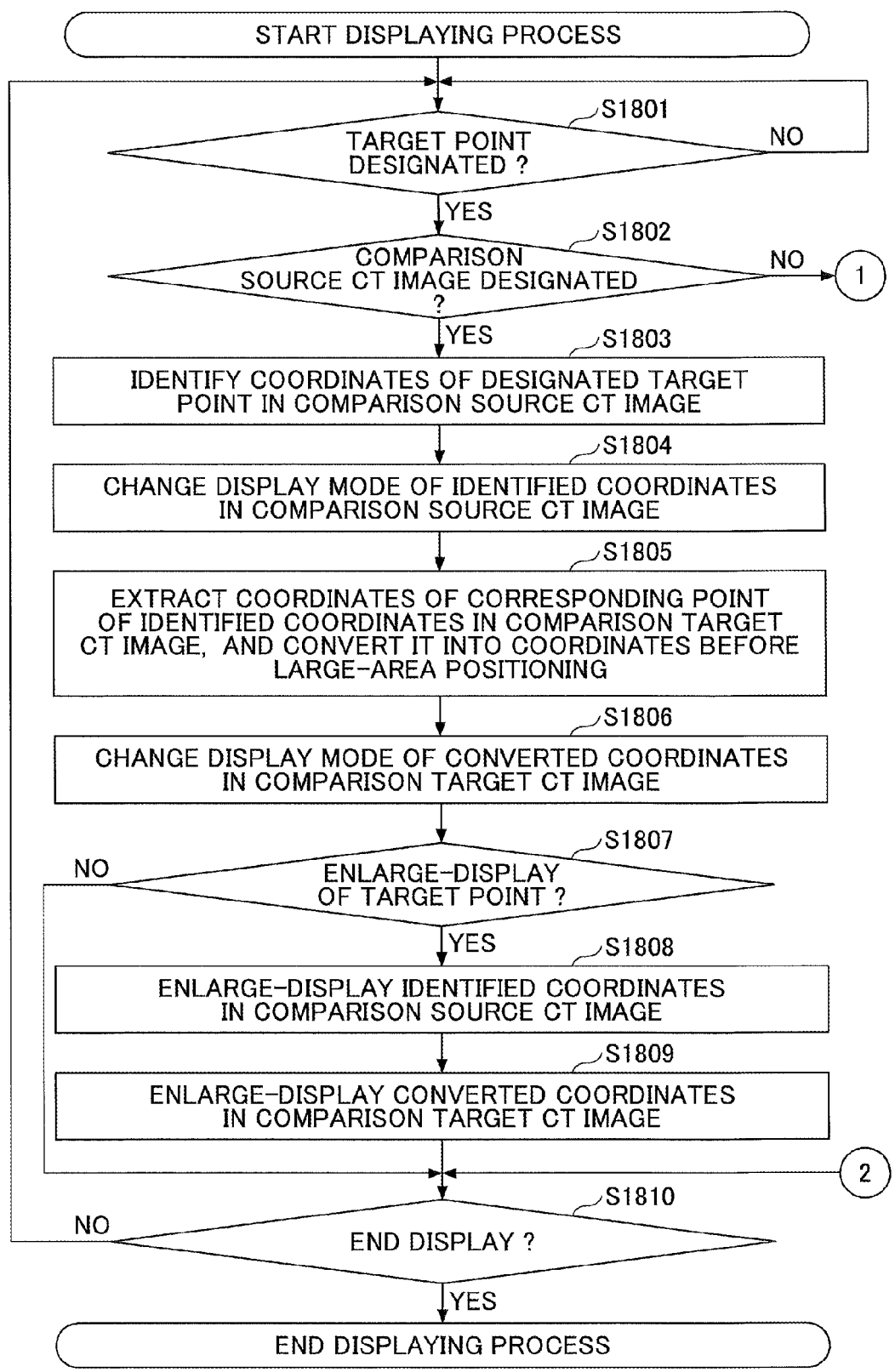

IMAGE DISPLAY APPARATUS, IMAGE DISPLAY METHOD AND STORAGE MEDIUM STORING IMAGE DISPLAY PROGRAM

CROSS-REFERENCE TO RELATED APPLICATIONS

This application is based upon and claims the benefit of priority of the prior Japanese Patent Application No. 2014-092758, filed on Apr. 28, 2014, the entire contents of which are incorporated herein by reference.

FIELD

The embodiments discussed herein are directed an image display technique.

BACKGROUND

Conventionally, there is a case in a medical site in which a medical doctor performs a diagnosis by using an x-ray computed tomography image (hereinafter, referred to as the "CT image"). For example, CT images taken in different photographing periods are displayed side by side on a display device, and the CT images are compared with each other to check how a lesion area has changed.

The following patent document discloses a background art.

Patent Document 1: Japanese Laid-Open Patent Application No. 2008-510247

There may be a variation in the position and angle of the lesion area in the CT images taken in different periods due to a difference in patient's position and a difference in the breathing timing of the patient. Accordingly, it may be difficult for a medical practitioner to accurately recognize a location of a focusing portion. Thus, it may be difficult for a medical practitioner to compare the changes in the focused lesion area.

SUMMARY

There is provided according to an aspect of the embodiments an image display apparatus, including: a display device configured to display a first CT image and a second CT image simultaneously, the first CT image and the second CT image representing the same object but taken in different time periods; and a computer configured to execute a program to cause the computer to serve as a display controlling part that performs: displaying the first and second CT images simultaneously on the display device according to a first display mode; determining a target portion designated in the first CT image; and changing a display mode of a corresponding portion of the second CT image from the first display mode into a second display mode, the corresponding portion corresponding to the target portion designated in the first CT image.

There is provided according to another aspect of the embodiments an image display apparatus including a computer to execute a program to cause the image display apparatus to perform an image displaying process including: identifying a peripheral edge of a predetermined part in each of two CT images that are taken in different time periods; determining opposite two points on the peripheral edge in one of the CT images, the two points being positioned on a straight line passing through a designated point designated in the one of the CT images; identifying two points on the peripheral edge corresponding to the two points on the peripheral edge of the one of the CT images from among points on the peripheral edge in the other CT image based on feature amounts of each point on the peripheral edges in the CT images; identifying a distance from the designated point in the one of the CT images to each of the two points determined in the one of the CT images; and identifying in the other CT image a point satisfying a ratio of the identified distances.

There is provided according to a further aspect of the embodiments an image display method of displaying a first CT image and a second CT image simultaneously, the first CT image and the second CT image representing the same object but taken in different time periods, the image display method including: displaying the first and second CT images simultaneously on a display device according to a first display mode; determining a target portion designated in the first CT image; and changing a display mode of a corresponding portion of the second CT image from the first display mode into a second display mode, the corresponding portion corresponding to the target portion designated in the first CT image.

BRIEF DESCRIPTION OF DRAWINGS

FIGS. 6A and 6B are illustrations for explaining an outline of a function of a feature point/amount extracting part;

FIGS. 8A and 8B are illustrations of feature amount information stored in a feature amount database;

FIG. 9 is an illustration of an outline of a function of the feature point matching part;

FIG. 10 is a flowchart of a feature point matching process performed by the feature point matching part;

FIG. 11 is an illustration of corresponding point information stored in a corresponding vector DB;

FIGS. 12A and 12B are illustrations for explaining a function of a corresponding point estimating part;

FIG. 13 is a flowchart of a corresponding point estimating process performed by the corresponding point estimating part;

FIG. 18A is a part of a flowchart of a second displaying process performed by the display controlling part.

DESCRIPTION OF EMBODIMENT(S)

A description will now be given of embodiments with reference to the drawings. In the description and drawings, structural elements having substantially the same functional structure are given the same reference sign, and duplicate descriptions thereof will be omitted.

First Embodiment

Figure 1:
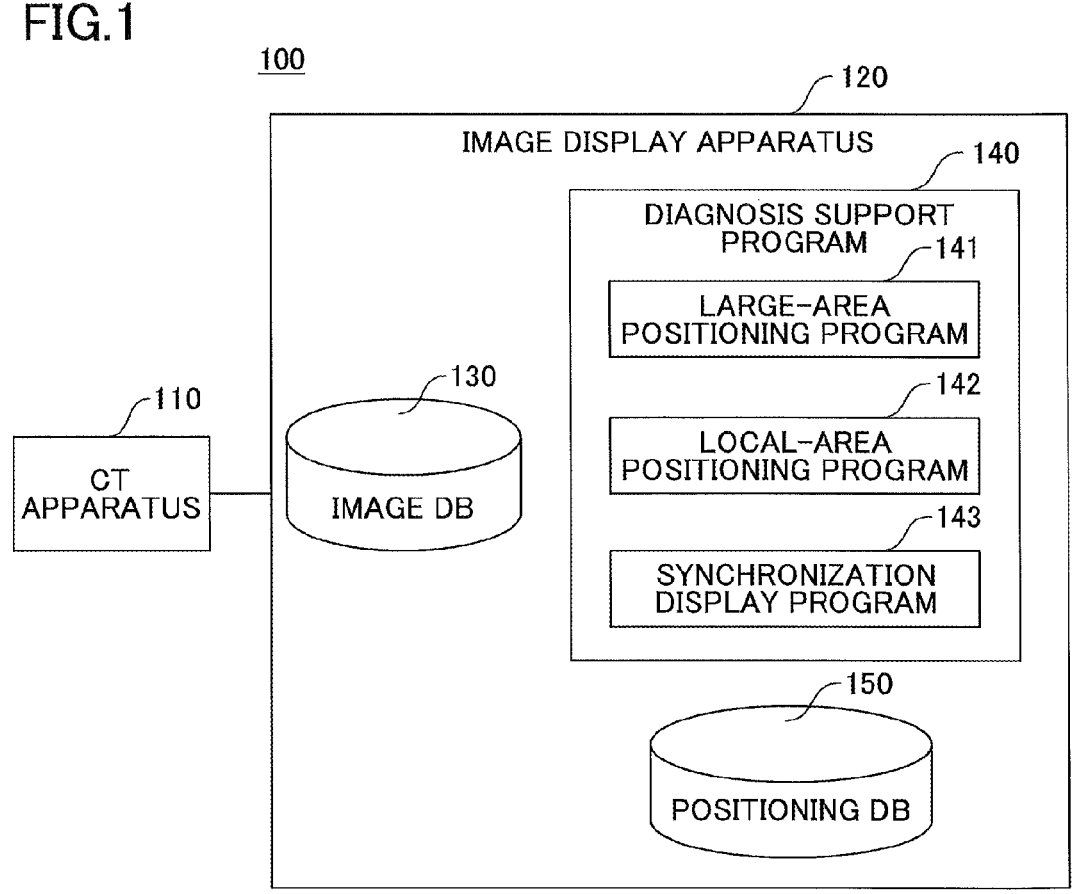
FIG. 1 is an illustration of an outline structure of a CT image photographing system.

A description is given first, with reference to FIG. 1, of a CT (Computed Tomography) image photographing system 100 including an image display apparatus 120 according to a first embodiment. FIG. 1 is an illustration of an example of the CT image photographing system 100.

The CT image photographing system 100 includes a CT apparatus 110 and the image display apparatus 120. The CT apparatus 110 and the image display apparatus 120 are electrically connected with each other so that they can exchange data with each other.

The CT apparatus 110 creates slice images (sectional images) of an interior of a patient's body by processing image data obtained by scanning the interior of the patient's body using radioactive rays. That is, the CT apparatus 100 takes slice images of the interior of the patient's body. The CT apparatus 100 sends the created slice images (hereinafter, referred to as the CT images) to the image display apparatus 120.

The image display apparatus 120 stores the CT images taken by the CT apparatus 110, and displays the CT images taken in different time periods simultaneously side by side by positioning or aligning the CT images so that picture positions in the CT images correspond to each other.

The image display apparatus 120 includes an image database 130 (hereinafter, the database is abbreviated as DB). Additionally, the image display apparatus 120 includes a diagnosis support program 140 that is used by a medical practitioner such as a doctor when diagnosing a patient based on the CT images taken by the CT apparatus 110

The diagnosis support program 140 includes a large-area positioning program 141 that corrects, when displaying the CT images that are taken in different time periods, mispositioning (misalignment and misregistration) between the CT images according to linear deformation when displaying the CT images that are taken in different time periods. The diagnosis support program 140 also includes a local-area positioning program 142 that performs the positioning between the CT images by correcting positioning errors remaining in the CT images to which the large-area positioning has been applied. The diagnosis support program 140 further includes a synchronization display program 143 for designating a target point in the CT images to which the large-area positioning has been applied and enlarging and displaying the target point.

Moreover, the image display apparatus 120 includes a positioning database (DB) 150 that stores data created when performing the local-area positioning program 142.

A description will now be given below of a hardware structure of the image display apparatus 120.

Figure 2:
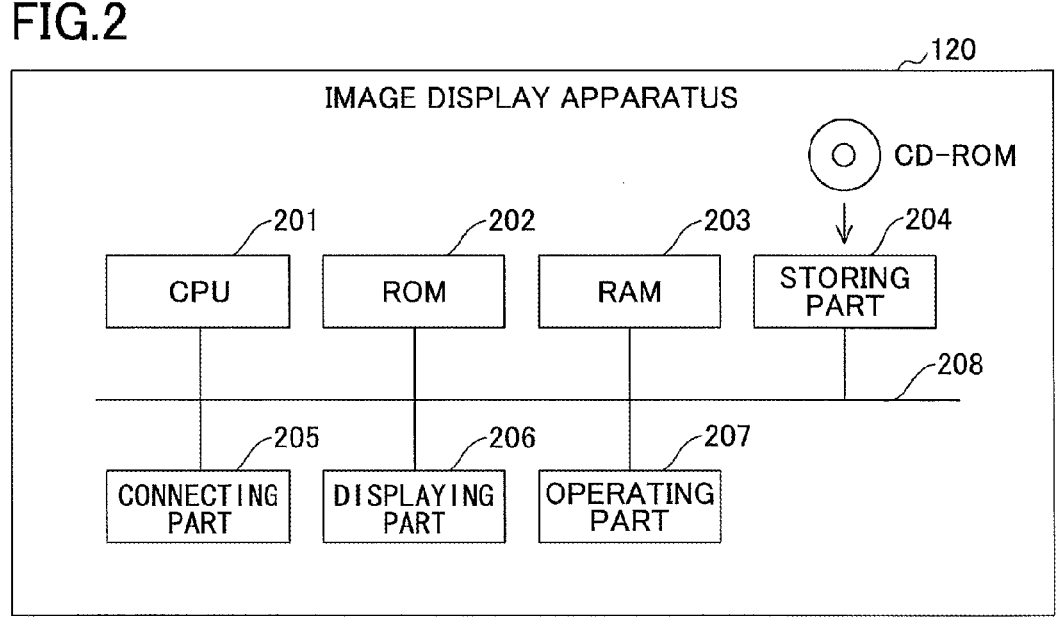
FIG. 2 is a block diagram of a hardware structure of an image display apparatus.

FIG. 2 is a block diagram illustrating a hardware structure of the image display apparatus 120. The image display apparatus 120 includes a CPU 2, a ROM (Read Only Memory) 202, a RAM (Random Access Memory) 203. The image display apparatus 120 also includes a storing part 204, a connecting part 205, a displaying part (display device) 206 and an operating part 207. These parts of the image display apparatus 120 are mutually connected through a bus 208. The storing part 204 may be a medium drive unit such as a CD-ROM drive unit that reads a computer readable storage medium such as a CR-ROM storing programs such as an image display program mentioned later.

The CPU 201 is configured by a computer that executes various kinds of programs stored in the storing part 204.

The ROM 202 is configured by a non-volatile memory. The ROM 202 stores various kinds of programs and data necessary for the CPU 201 to execute various programs stored in the storing part 204. Specifically, the ROM 202 stores boot programs such as a BIOS (Basic Input/Output System), an EFI (Extensible Firmware Interface), etc.

The RAM 203 is a main storage device such as a DRAM (Dynamic Random Access Memory), SRAM (Static Random Access Memory), etc. The RAM 203 serves as a work area that is developed when various programs in the storing part 204 are executed by the CPU 201.

The storing part 204 stores various programs installed in the image display apparatus 120 and data created by executing the programs. The connecting part 205 is connected to the CT apparatus 110 to perform exchange of data with the CT apparatus 110. The displaying part 206 displays CT images, which are taken by the CT apparatus 110 and stored in the image DB 130. The operating part 207 receives various operations that are performed on the image display apparatus 120 by a medical practitioner such as a doctor.

Next, a description is given of a relationship between contents of an operation performed on the image display apparatus 120 by a medical practitioner such as a doctor and contents of display on the displaying part 206 in a state where the diagnosis support program 140 is performed in the image display apparatus 120. FIGS. 3(a)-(d) are illustrations indicating the relationship between the operation contents and the display contents in the image display apparatus 120 and an operation of the diagnosis support program 140.

Figure 3:
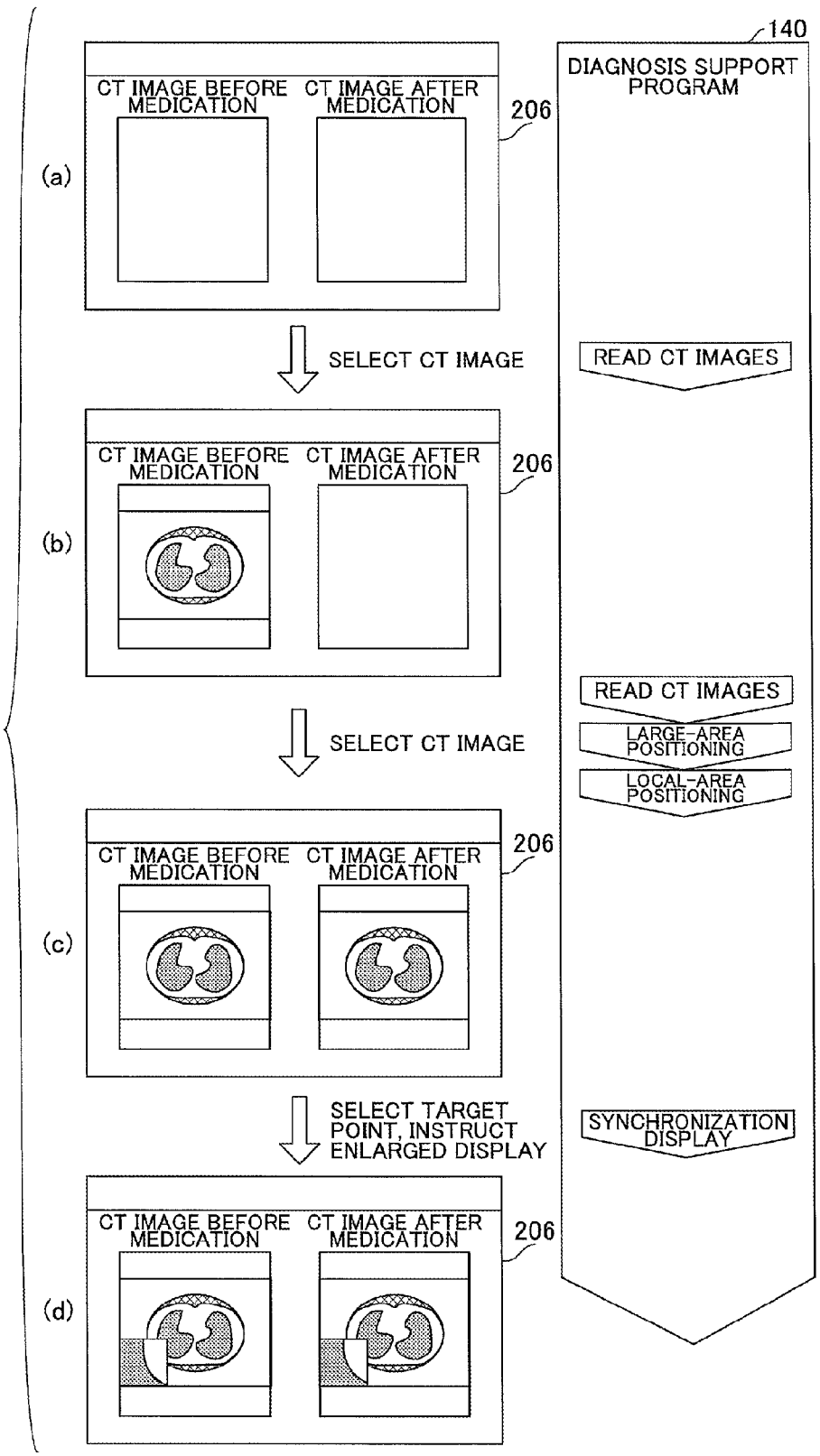
FIGS. 3(a)-(d) are illustrations of display contents on the image display apparatus with an operation of a diagnosis support program.
Figure 4:
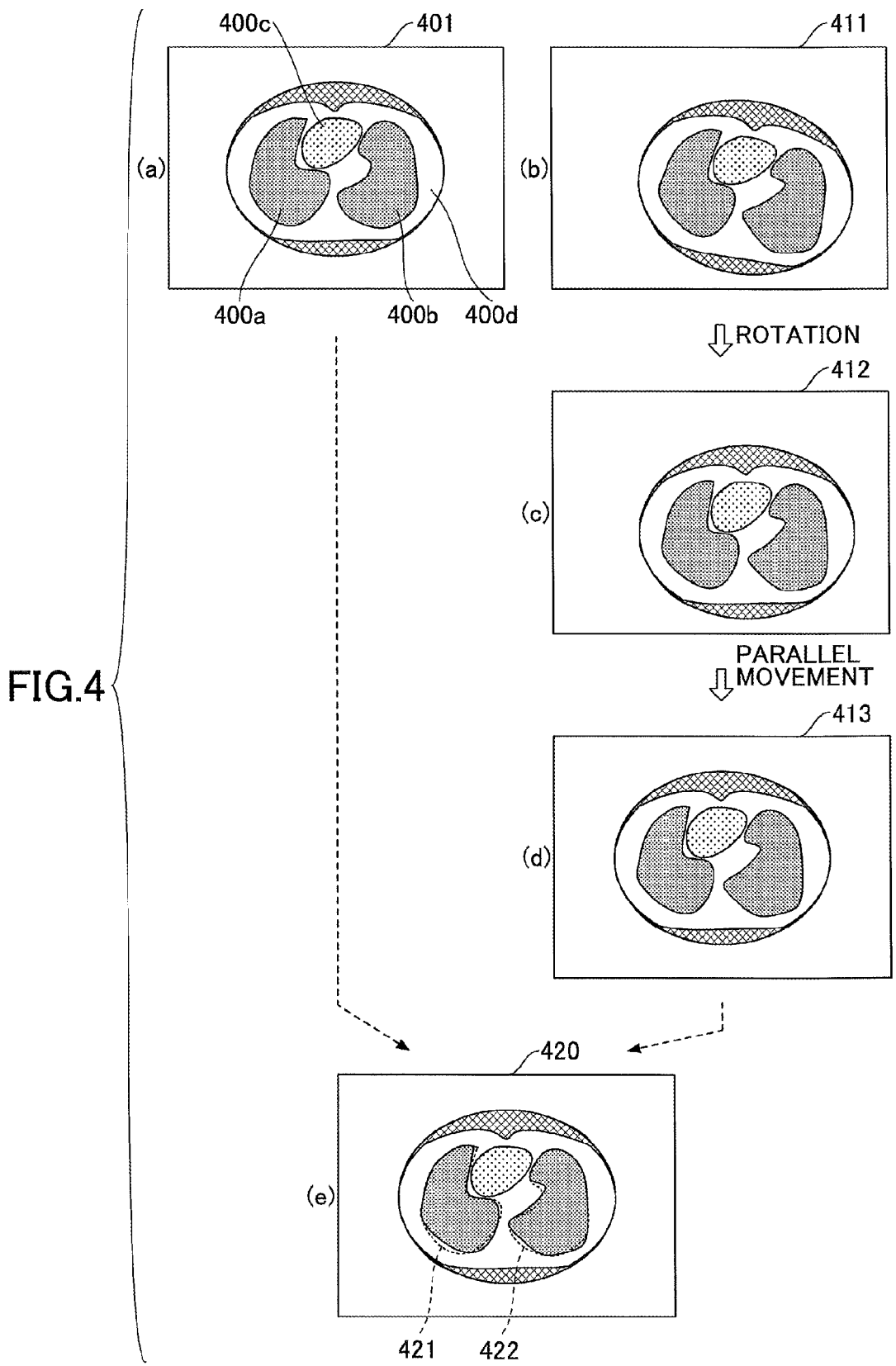
FIGS. 4(a)-(e) are illustrations of CT images for explaining large-area positioning of the CT images taken in different time periods.

When the diagnosis support program 140 is executed in the image display apparatus 120, a parallel display screen, which is to display CT images taken in different time periods side by side, is displayed on the displaying part 206 as illustrated in FIG. 3(a). In the state where the parallel display screen is displayed, when a medical practitioner such as a doctor selects a CT image to be used in diagnosis, the diagnosis support program 140 reads the selected CT image from the image DB 130.

Then, the diagnosis support program 140 displays the read CT image as, for example, a CT image before medication (refer to FIG. 3(b)).

In the state where the CT image before medication is displayed, when a CT image after medication is selected by the medical practitioner such as a doctor, the diagnosis support program 140 reads the selected CT image from the image DB 130.

At this time, the diagnosis support program 140 activates the large-area positioning program 141 to apply a large-area positioning to the read CT image. Further, the diagnosis support program 140 activates the local-area positioning program 142 to apply a local-area positioning to the CT image to which the large-area positioning has been applied.

Then, the diagnosis support program 140 displays the CT image to which the local-area positioning has been applied as, for example, a CT image after medication (refer to FIG. 3(c)).

In the state where the CT image before medication and the CT image after medication are displayed side by side, the diagnosis support program 140 causes the synchronization display program 143 to be executed. Thereby, as illustrated in FIG. 3(d), if an arbitrary position in one of the CT images is designated as a target point by the medical practitioner such as a doctor, a point corresponding to the designated point in the other CT image is designated as a target point. Additionally, if an instruction of enlarged display is input with respect the designated target point in one of the CT images, the designated target point is enlarged and displayed also in the other CT image.

As mentioned above, in the image display apparatus 120, when displaying the CT images, which are taken in different time periods, side by side, the CT images are subjected to the large-area positioning and local-area positioning beforehand. Additionally, in the image display apparatus 120, if an operation such as, for example, a designation of a target point is performed with respect to one of the CT images that are taken in different time periods and displayed side by side, the same operation (designation of a target point) is automatically performed in synchronization in a corresponding position in the other CT image. Thus, for example, the practitioner such as a doctor can easily grasp corresponding positions in the CT images, thereby easily comparing the corresponding positions to check how the lesion area has changed.

A description is given below in detail of various functions achieved by the large-area positioning program 141, local-area positioning program 142 and synchronization display program 143 that are contained in the diagnosis support program 140.

First, a description is given of an outline of the large-area positioning for the CT images taken in different time periods that is achieved by the execution of the large-area positioning program 141. FIGS. 4(a)-(e) are illustrations indicating an outline of the large-area positioning for the CT images taken in different time periods. Each of the CT images illustrated in FIGS. 4(a)-(e) indicates a cross-section of the chest portion of a patient viewed from the head side of the patient. In each of the CT images, a left lung 400a, right lung 400b, heart 400c and body fat 400d (refer to the CT image 401) of the patient are imaged.

The CT image 401 is one of the CT images taken in different time periods that is taken earlier than the other (for example, a CT image taken before a medical operation or medication), and is, hereinafter, referred to as the "comparison source CT image".

On the other hand, the Ct image 411 is one of the CT images taken in different time periods that is taken later than the other (for example, a CT image taken after a medical operation or medication), and is, hereinafter, referred to as the "comparison target CT image".

According to the execution of the large-area positioning program 141, a linear deformation is applied to the comparison target CT image 411. Specifically, the comparison target CT image 411 is rotated to match the comparison source CT image 401 to create the comparison target CT image 412. Additionally, the rotated comparison target CT image 412 is moved (displaced) parallel to create the comparison target CT image 413. Although not illustrated in the example of FIGS. 4(a)-(e), an enlarging or reducing process may be applied, if necessary, to the CT images.

As mentioned above, by applying a linear deformation to the comparison target CT image 411, the comparison target CT image 411 can be roughly matched the comparison source CT image 401. The image 420 illustrates an image where the comparison target CT image 413, which has been subjected to the large-area positioning, is overlapped with the comparison source CT image 401.

According to the image 420, it can be interpreted that the comparison target CT image 413 can be roughly matched the comparison source CT image 401 by applying the large-area positioning. However, a local positional displacement may remain as indicated by dotted lines 421 and 422 if only the large-area positioning is applied. This is because there is a difference in timing of breath and heartbeat of the patient between the time at which the comparison source CT image 401 is taken and the time at which the comparison target CT image 411 is taken.

Thus, in the image display apparatus 120, the local-area positioning is applied to the comparison target CT image 413, which has been subjected to the large-area positioning, by executing the local-area positioning program 142. Further, by executing the synchronization display program 143 using the result of the local-area positioning, a display control is performed to permit an easy comparison between the comparison source CT image 401 and the comparison target CT image 413 to which the local-area positioning has been applied. A description is given below of the local-area positioning and display control by the image display apparatus 120.

Figure 5:
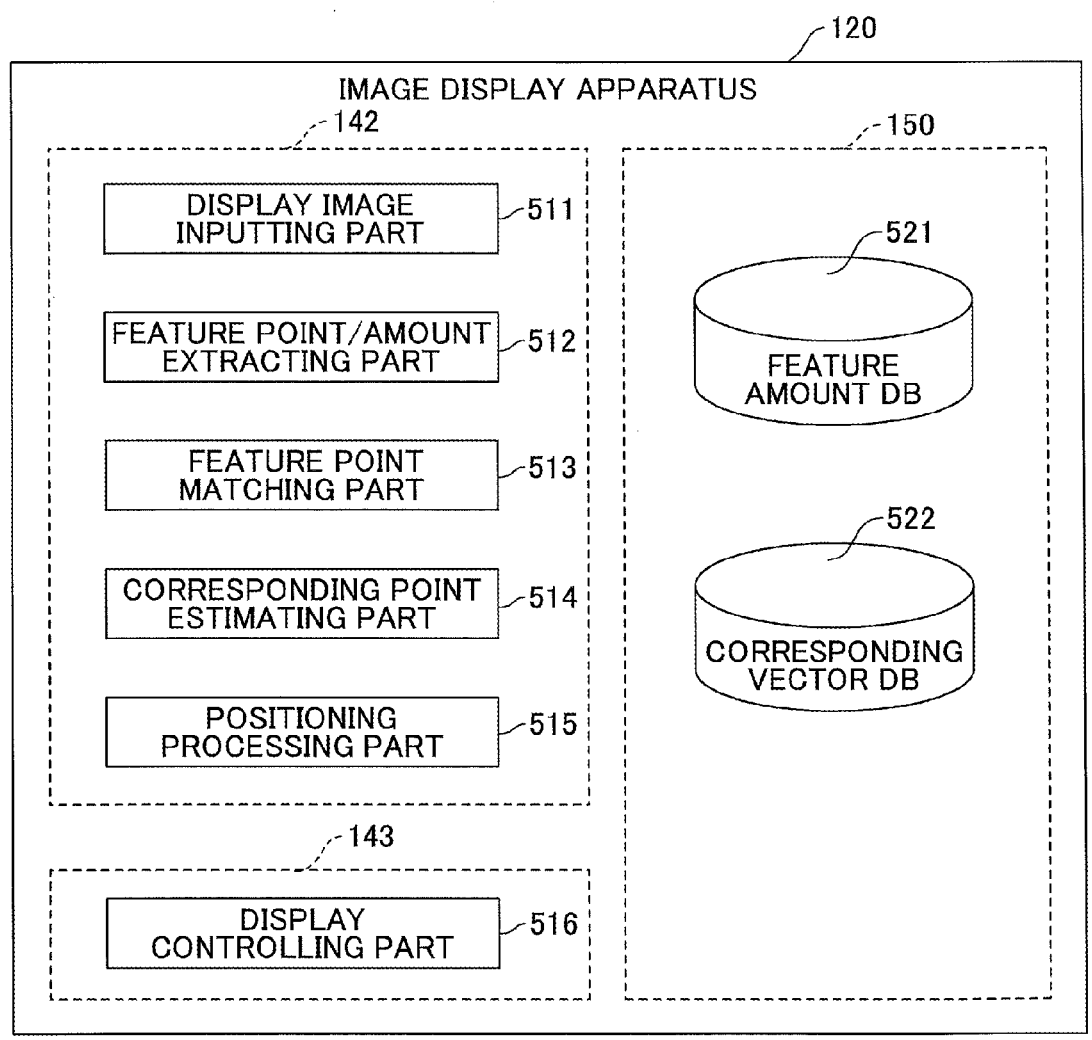
FIG. 5 is a block diagram of a functional structure of the image display apparatus to achieve a local-area positioning and display control.

First, a description is given of the functional structure for the local-area positioning and display control by the image display apparatus 120. FIG. 5 is a clock diagram illustrating the local-area positioning and display control by the image display apparatus 120.

The image display apparatus achieves the function of each part mentioned below by the CPU 120 executing the local-area positioning program 142 and the synchronization display program 143. In the present embodiment, a positioning DB 150 of the image display apparatus 120 includes a feature amount DB 521 and a corresponding vector DB 522, each of which is provided in the storing part 204.

As illustrated in FIG. 5, the image display apparatus 120 includes a display image inputting part 511, feature point/amount extracting part 512, feature point matching part 513, corresponding point estimating part 514 and positioning processing part 515. The image display apparatus 120 also includes a display controlling part 516.

The display image inputting part 511 inputs the comparison source CT image 401 and the comparison target CT image 413 to which the large-area positioning process has been applied in accordance with the instruction by the medical practitioner such as a doctor.

The feature point/amount extracting part 512 computes a feature amount with respect to each of a plurality of feature points contained in the input comparison source CT image 401. The feature point/amount extracting part 512 also computes a feature amount with respect to each of a plurality of feature points contained in the input comparison target CT image 413.

The feature point matching part 513 determines a feature point of each of the feature points of the comparison target CT image 413 corresponding to each of feature points of the comparison source CT image 401 based on the feature amount of each of the feature points of the comparison source CT image 401 and the feature amount of each of the feature points of the comparison target CT image 413. The feature point matching part 513 stores the determined corresponding points in the corresponding vector DB 522 as corresponding point information.

The corresponding point estimating part 514 estimates a corresponding point in the comparison target CT image 413 with respect to each feature point in the comparison source CT image 401 for which a corresponding point has not been decided in the feature point matching part 513. Additionally, the corresponding point estimating part 514 stores the corresponding point information in the corresponding vector DB 522 after adding the estimated feature point to the corresponding point information.

The positioning processing part 515 performs the local-area positioning process on the comparison target CT image 413 to which the large-area positioning process is applied based on the corresponding point information stored in the corresponding vector DB 522.

In a state where the comparison source CT image 401 and the comparison target CT image 413 to which the local-area positioning process has been applied are displayed side by side, if a part of one of the CT images is designated, the display controlling part 516 controls the display so that a corresponding position in the other CT image is automatically designated. Further, if the medical practitioner such as a doctor inputs an instruction of enlarged display with respect to a part of one of the CT images displayed side by side, the display controlling part 516 controls the display so that the corresponding position in the other CT image is automatically enlarged and displayed (enlarge-displayed).

Next, a description is given of details of various functions for the local-area positioning by the image display apparatus 120. FIGS. 6A and 6B are illustrations illustrating an outline of the function of the feature point/amount extracting part 512.

As illustrated in FIG. 6A, the feature point/amount extracting part 512 divides the comparison source CT image 401 by a plurality of grid lines extending in a longitudinal direction and a plurality of grid lines extending in a transverse direction, and determines each intersection of the grid lines as a feature point. In the example of FIG. 6A, the thus-determined feature points are indicated as $\alpha_1$, $\alpha_2$, $\alpha_3$, . . . .

Additionally, the feature point/amount extracting part 512 computes a feature amount of each feature point of the comparison source CT image 401 based on brightness values of pixels contained in an area of a predetermined number of pixels (for example, an area of a radius of 10 pixels) in the periphery of the feature point.

Specifically, the feature point/amount extracting part 512 extracts two arbitrary pixels contained in an area 601 surrounding the feature point $\alpha_1$, and calculates a difference in brightness value between the two pixels. Then, if the calculated brightness difference is greater than a predetermined threshold value, the feature point/amount extracting part 512 sets "1" to the feature amount of the feature point $\alpha_1$. If the calculated difference is smaller than or equal to the predetermined threshold value, the feature point/amount extracting part 512 sets "0" to the feature amount of the feature point $\alpha_1$.

In the example of FIG. 6A, points $A_1$ and $B_1$ are extracted as the two arbitrary pixels, and "1" is set to the feature amount of the feature point $\alpha_1$ because the brightness difference between the two points is larger than the threshold value. Further, other points $A_2$ and $B_2$ are extracted as the two arbitrary pixels, and "0" is set to the feature amount of the feature point $\alpha_1$ because the brightness difference between the two points is smaller than the threshold value. The process of extracting two pixels from an area surrounding one feature point is repeated for a plurality of times (for example, 128 times). That is, the number of digits corresponding to the predetermined number of times (for example, 128 digits) are contained in the feature amount of one feature point.

Similarly, as illustrated in FIG. 6B, the feature point/amount extracting part 512 divides the comparison target CT image 413 by a plurality grid lines extending in a longitudinal direction and a plurality of grid lines extending in a transverse direction, and determines each intersection of the grid lines as a feature point. In the example of FIG. 6B, the thus-determined feature points are indicated as $\beta_1$, $\beta_2$, $\beta_3$, . . . .

Additionally, the feature point/amount extracting part 512 computes a feature amount of each feature point of the comparison target CT image 413 based on brightness values of pixels contained in an area of a predetermined number of pixels (for example, an area of a radius of 10 pixels) in the periphery of the feature point.

Specifically, the feature point/amount extracting part 512 extracts two arbitrary pixels contained in an area 601 surrounding the feature point $\alpha_1$, and calculates a difference in brightness value between the two pixels. Then, if the calculated brightness difference is greater than a predetermined threshold value, the feature point/amount extracting part 512 sets "1" to the feature amount of the feature point $\beta_1$. If the calculated difference is smaller than or equal to the predetermined threshold value, the feature point/amount extracting part 512 sets "0" to the feature amount of the feature point $\beta_1$.

In the example of FIG. 6B, points $A_1$ and $B_1$ are extracted as the two arbitrary pixels, and "1" is set to the feature amount of the feature point $\beta_1$ because the brightness difference between the two points is larger than the threshold value. Further, other points $A_2$ and $B_2$ are extracted as the two arbitrary pixels, and "0" is set to the feature amount of the feature point $\beta_1$ because the brightness difference between the two points is smaller than the threshold value. The process of extracting two pixels from an area surrounding one feature point is repeated for a plurality of times (for example, 128 times). That is, the number of digits corresponding to the predetermined number of times (for example, 128 digits) are contained in the feature amount of one feature point.

Figure 7:
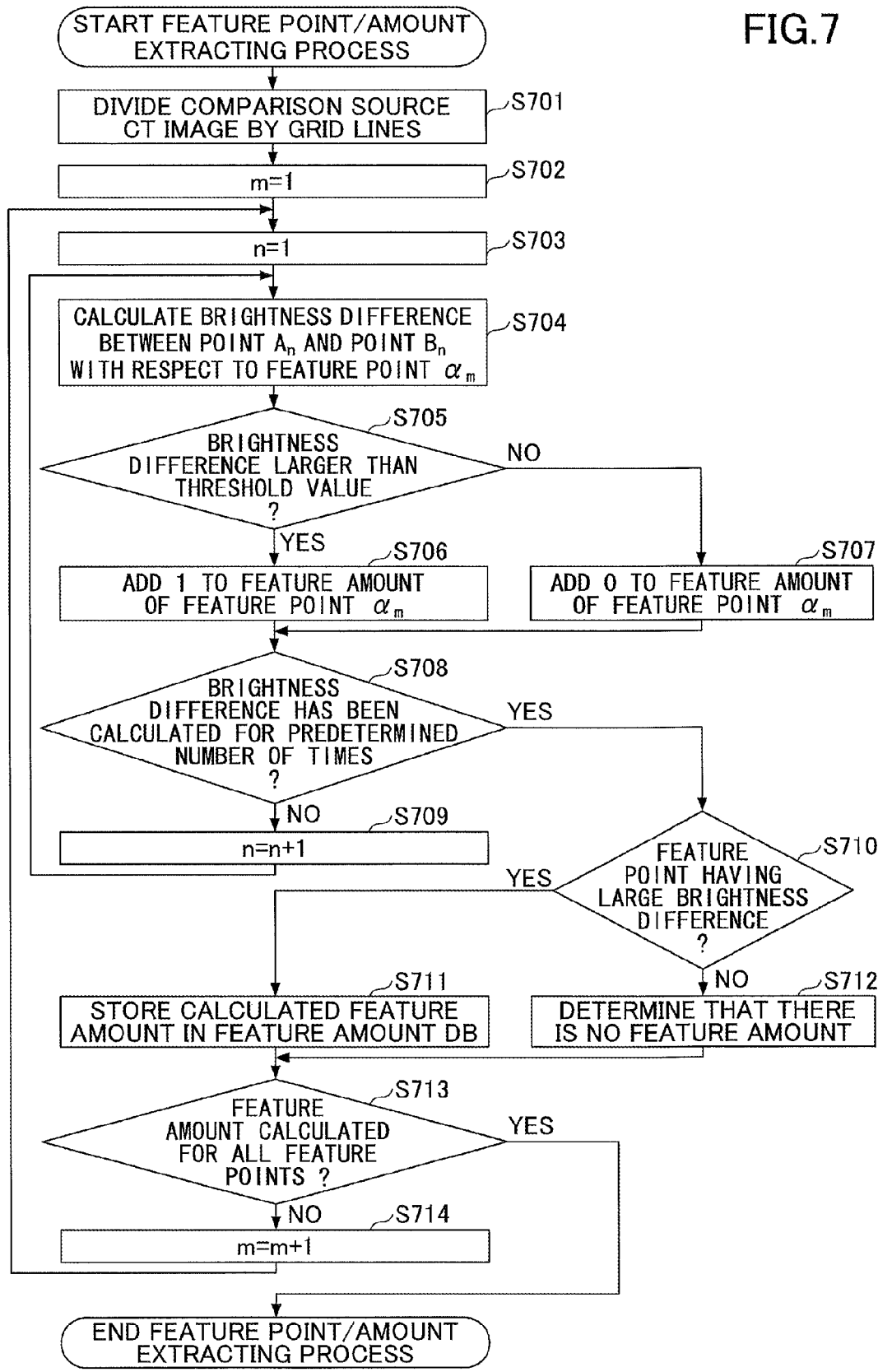
FIG. 7 is a flowchart of a feature point/amount extracting process performed by the feature point/amount extracting part.

Next, a description is given of a flow of the feature point/amount extracting process performed by the feature point/amount extracting part 512. FIG. 7 is a flowchart of the feature point/amount extracting process. Although, a description is given below, for the sake of simplification of explanation, of a case of performing the feature point/amount extracting process on the comparison source CT image 401, the same applies to the comparison target CT image 413.

As illustrated in FIG. 7, the feature point/amount extracting part 512 divides, in step S701, the comparison source CT image 401 using a plurality of longitudinally extending grid lines and a plurality of transversely extending grid lines. Additionally, the feature point/amount extracting part 512 determines each intersection of the grid lines as a feature point.

In step S702, the feature point/amount extracting part 512 substitutes 1 for a counter value m, which is used for counting the number of feature points.

In step S703, the feature point/amount extracting part 512 substitutes 1 for a counter value n, which is used for counting the number of feature amounts.

In step S704, the feature point/amount extracting part 512 extracts points $A_n$ and $B_n$ in the area 601 surrounding the feature point $\alpha_m$, and calculates a difference in brightness value (brightness difference) between the extracted points $A_n$ and $B_n$.

Then, the feature point/amount extracting part 512 determines, in step S705, whether the brightness difference calculated in step S704 is greater than a predetermined value. If it is determined, in step S705, that the brightness difference is greater than the predetermined value, the process proceeds to step S706 where "1" is added to the feature amount of the feature point $\alpha_m$. On the other hand, if it is determined, in step S705, that the brightness difference is smaller than or equal to the predetermined value, the process proceeds to step S707 where "0" is added to the feature amount of the feature point $\alpha_m$.

The feature point/amount extracting part 512 determines, in step S708, whether the brightness difference has been calculated for a predetermined number of times (for example, 128 times). If it is determined, in step S708, that the brightness difference has not been calculated for the predetermined number of times, the process proceeds to step S709. Then, in step S709, the feature point/amount extracting part 512 increments the counter value n, which is used for counting the number of feature amounts, and, thereafter, the process returns to step S704.

On the other hand, if it is determined, in step S708, that the brightness difference has been calculated for the predetermined number of times, the process proceeds to step S710. Then, in step S710, the feature point/amount extracting part 512 calculates the number of pieces of "1" contained in the calculated feature amount with respect to the feature point $\alpha_m$. If the result of calculation indicates that the number of "1" contained in the feature amount is greater than the predetermined threshold value, it is determined that the feature point $\alpha_m$ has a large brightness difference, and the process proceeds to step S711.

Here, the feature point having a large brightness difference in a CT image is positioned, for example, on the body surface of the patient, a marginal portion of left and right lungs, or a marginal portion of the heart of the patient.

In step S711, the feature point/amount extracting part 512 stores the feature amount of the feature point $\alpha_m$ in the feature amount DB 521.

On the other hand, if the number of pieces of "1" contained in the calculated feature amount is smaller than the predetermined threshold value, the feature point/amount extracting part 512 determines that the feature point $\alpha_m$ has a small brightness difference, and the process proceeds to step S712.

Note that the feature point having a small brightness difference in a CT image generally positions inside the left and right lungs and the heart of the patient.

Then, the feature point/amount extracting part 512 determines that there is no feature amount of the feature point $\alpha_m$. In this case, the feature amount of the feature point $\alpha_m$ is not stored in the feature amount DB 521.

In step S713, the feature point/amount extracting part 512 determines whether the feature amount is calculated for all feature points contained in the comparison source CT image 401. If it is determined, in step S713, that there is a feature point for which the feature amount has not been calculated, the process proceeds to step S714. Then, in step S714, the feature point/amount extracting part 512 increments the counter value m, and, thereafter, the process returns to S703.

On the other hand, if it is determined, in step S713, that the feature amount is calculated for all feature points contained in the comparison source CT image 401, the feature point/amount extracting process is ended.

Next, a description is given of the feature amount information stored in the feature amount DB 521. FIGS. 8A and 8B are illustrations of the feature amount information stored in the feature amount DB 521.

As illustrated in FIGS. 8A and 8B, the feature amount information is managed by being divided into information regarding the comparison source CT image 401 (FIG. 8A) and information regarding the comparison target CT image 413 (FIG. 8B). The feature amount information 800 of the comparison source CT image 401 contains the "feature point" and "feature amount" as information items.

The feature points extracted from the comparison source CT image 401 are stored in the column of "feature point" in the table illustrated in FIG. 8A. The feature amounts of the feature points extracted from the comparison source CT image 401 are stored in the column of "feature amount" in the table illustrated in FIG. 8A.

Similarly, the feature amount information 810 of the comparison target CT image 413 contains the "feature point" and "feature amount" as information items. The feature points extracted from the comparison target CT image 413 are stored in the column of "feature point" in the table illustrated in FIG. 8B. The feature amounts of the feature points extracted from the comparison target CT image 413 are stored in the column of "feature amount" in the table illustrated in FIG. 8B.

In the feature point/amount extracting process, a feature amount is not stored for the feature point, which is determined as having no feature amount (the feature point $\alpha_3$ in FIG. 8A and the feature point $\beta_{M-1}$ in FIG. 8B).

Next, a description is given of a function of the feature point matching part 513 from among functions for performing the local-area positioning by the image display apparatus 120. FIG. 9 is an illustration indicating an outline of the function of the feature point matching part 513.

As illustrated in FIG. 9, the feature point matching part 513 calculates exclusive-OR with respect to the feature amounts of the feature points in order to extract the feature points of the comparison target CT image 413 corresponding to the feature points of the comparison source CT image 401.

Specifically, the feature point matching part 513 calculates exclusive-OR of the feature amount of the feature point $\alpha_1$ of the comparison source CT image 401 and each of the feature amounts of the respective feature points $\beta_1$, $\beta_2$, $\beta_3$, of the comparison target CT image 413. Although only the exclusive-OR of the feature amount of the feature point $\alpha_1$ of the comparison source CT image 401 and the feature amounts of the feature points of the comparison target CT image 413 is illustrated in FIG. 9, the feature point matching part 513 calculates exclusive-OR with respect to other feature points contained in the comparison source CT image 401.

Additionally, the feature point matching part 513 calculates similarity between the feature points based on the calculation results of the exclusive-OR. For example, the feature point matching part 513 calculates the similarity in accordance with the number of "0" contained in the calculation results of the exclusive-OR.

Further, the feature point matching part 513 determines the feature point having the maximum similarity from among the calculated similarities between the feature amounts as a "corresponding point". For example, if the similarity between the feature amount of the feature point $\alpha_1$ of the comparison source CT image 401 and the feature amount of the feature point $\beta_1$, the comparison target CT image 413 is maximum, the corresponding point of the feature point $\alpha_1$ of the comparison source CT image 401 is determined to be the feature point $\beta_1$ of the comparison target CT image 413.

Next, a description is given of a flow of the feature point matching process performed by the feature point matching part 513. FIG. 10 is a flowchart of the feature point matching process performed by the feature point matching part 513.

In step S1001, the feature point matching part 513 substitutes 1 for a counter value ma, which is used to count the feature points of the comparison source CT image 401.

In step S1002, the feature point matching part 513 substitutes 1 for a counter value mb, which is used to count the feature points of the comparison target CT image 413.

In step S1003, the feature point matching part 513 reads the feature amount of the feature point $\alpha_{ma}$ from the feature amount DB 521. In step S1004, the feature point matching part 513 determines whether a feature amount of the feature point $\alpha_{ma}$ exists.

If it is determined, in step S1004, that no feature amount of the feature point $\alpha_{ma}$ exists, the process proceeds to step S1012 to determine that there is no corresponding point for the feature point $\alpha_{ma}$. On the other hand, if it is determined, in step S1004, that a feature amount of the feature point $\alpha_{ma}$ exists, the process proceeds to step S1005.

In step S1005, the feature point matching part 513 reads the feature amount of the feature point $\alpha_{ma}$ from the feature amount DB 521. In step S1006, the feature point matching part 513 determines whether a feature amount of the feature point $\beta_{mb}$ exists.

If it is determined, in step S1006, that no feature amount of the feature point $\beta_{mb}$ exists, the process proceeds to step S1009. On the other hand, if it is determined, in step S1006, that a feature amount of the feature point $\beta_{mb}$ exists, the process proceeds to step S1007.

In step S1007, the feature point matching part 513 calculates exclusive-OR of the feature amount of the feature point $\alpha_{ma}$ and the feature amount of the feature point $\beta_{mb}$. In step S1008, the feature point matching part 513 calculates a similarity between the feature amount of the feature point $\alpha_{ma}$ and the feature amount of the feature point $\beta_{mb}$.

Then, the feature point matching part 513 calculates, in step S1009, whether the calculation of exclusive-OR with the feature point $\alpha_{ma}$ has been performed for all feature points of the comparison target CT image 413. If it is determined, in step S1009, that there is a feature point for which the exclusive-OR with the feature point $\alpha_{ma}$ has not been calculated among the feature points of the comparison target CT image 413, the process proceeds to step S1010. In step S1010, the feature point matching part 513 increments the counter value ma, and the process returns to step S1005.

On the other hand, if it is determined, in step S1009, that the exclusive-OR with the feature point $\alpha_{ma}$ has been calculated for all feature points of the comparison target CT image 413, the process proceeds to step S1011.

In step S1011, the feature point matching part 513 determines whether all of the calculated similarities are smaller than a threshold value. If it is determined, in step S1011, that all of the calculated similarities are smaller than the threshold value, the process proceeds to step S1012. In step S1012, the feature point matching part 513 determines that the feature point of the comparison target CT image 413 corresponding to the feature point $\alpha_{ma}$ of the comparison source CT image 401 does not exists, and determines that there is no corresponding point for the feature point $\alpha_{ma}$.

On the other hand, if it is determined, in step S1011, that there is a similarity, which is greater than or equal to the threshold value, among the calculated similarities, the process proceeds to step S1013. In step S1013, the feature point matching part 513 determines the feature point having the maximum similarity among the feature points of the comparison target CT image 413 as the corresponding point of the feature point $\alpha_{ma}$ of the comparison source CT image 401.

In step S1014, the feature point matching part 513 stores the corresponding point determined in step S1013 in the corresponding vector DB 522. If it is determined, in step S1012, that there is no corresponding point, the feature point matching part 513 stores information, which indicates that there is no corresponding point corresponding to the feature point $\alpha_{ma}$, in the corresponding vector DB 522.

Then, the feature point matching part 513 determines, in step S1015, whether the feature point matching process has been performed on all feature points of the comparison source CT image 401. If it is determined, in step S1015, that there is a feature point for which the feature point matching process has not been performed among the feature points of the comparison source CT image, the process proceeds to step S1016. In step S1016, the feature point matching part 513 increments the counter value ma, and the process returns to step S1002.

On the other hand, if it is determined, in step S1015, that the feature point matching process has been performed on all feature points of the comparison source CT image 401, the feature point matching process is ended.

As mentioned above, in the image display apparatus according to the present embodiment, if it is determined that there is no feature amount of the feature point in the feature point matching process, the process for determining the corresponding point is not performed and a determination is made that there is no corresponding point. Additionally, if there is no feature amount of the feature point $\beta_{mb}$, the calculation of the similarity is not performed.

As a result, the image display apparatus 120 can perform the feature point matching process with a small amount of calculation when executing the local-area positioning program 142.

Next, a description is given of the corresponding point information stored in the corresponding vector DB 522 by the feature point matching process. FIG. 11 is an illustration illustrating the corresponding point information stored in the corresponding vector DB 522.

As illustrated in FIG. 11, the corresponding point information 1100 includes, as information items, the "feature point of comparison source CT image" and "feature point of comparison source CT image". The feature points of the comparison source CT image 401 are stored in the "feature point of comparison CT image". The feature points determined as the corresponding points of the feature points of the comparison source CT image 401 from among the feature points of the comparison target CT image 413 are stored in the column of the "feature point of comparison target CT image" in the table of FIG. 11. Note that, in the example of FIG. 11, the feature points $\alpha_3$ and $\alpha_{M-1}$, of the comparison source CT image 401 indicate that there is no corresponding feature points in the comparison target CT image 413, and it is determined that there is no corresponding point.

A description is given below of a function of the corresponding point estimating part 514 from among functions for local-area positioning by the image displaying apparatus 120. FIG. 12 is an illustration of an outline of a function of the corresponding point estimating part 514.

The corresponding point estimating part 514 estimates a feature point corresponding to the feature point for which a determination is made that there is no corresponding point in the feature point matching part 513 from among the feature points of the comparison source CT image 401.

In FIGS. 12A and 12B, enlarged display parts 1201 and 1202 are enlarged illustrations of parts of the comparison source CT image 401 and comparison target CT image 413 for the sake of easy understanding of the explanation. In the enlarged display part 1201, a point $\alpha_x$ is a point indicating an interior of the lung of a patient, which may be a feature point determined as having no corresponding point by the feature point matching part 513. The point $\alpha_x$ may be estimated by using corresponding vectors of surrounding feature points such as feature points $\alpha_{11}$ and $\alpha_{12}$.

The boundary lines 1202 and 1212 are peripheral edges indicating boundaries between an interior and an exterior of the lung of the patient. The feature point $\alpha_{11}$ is a point on the boundary line 1202, which is a point for which the feature point $\beta_{11}$ on the boundary line 1212 (refer to the enlarged display part 1211) is determined as a corresponding point.

Similarly, the boundary lines 1203 and 1213 are peripheral edges indicating boundaries between an interior and an exterior of the lung of the patient. The feature point $\alpha_{12}$ is a point on the boundary line 1203, which is a point for which the feature point $\beta_{12}$ on the boundary line 1213 (refer to the enlarged display part 1211) is determined as a corresponding point.

Here, the feature points $\alpha_{11}$ and $\alpha_{12}$ are specified as the intersections of a straight line 1204 passing through the point $\alpha_x$ and each of the boundary lines 1202 and 1203, and are opposite to each other with the point $\alpha_x$ interposed therebetween. It is assumed that the distance between the point $\alpha_x$ and the feature point $\alpha_{11}$ is $r_1$, and the distance between the point $\alpha_x$ and the feature point $\alpha_{12}$ is $r_2$.

The corresponding point estimating part 514 estimates a point $\beta_x$, which is the corresponding point of the point $\alpha_x$, based on the feature points $\alpha_{11}$ and $\alpha_{12}$ and the relationship between the feature points $\alpha_{11}$ and $\alpha_{12}$.

Specifically, the corresponding point estimating part 514 acquires the straight line 1214 passing through the feature points $\beta_{11}$ and $\beta_{12}$, and estimates the point $\beta_x$, which is a point on the straight line 1214 and at which a ratio of the distance from the point $\beta_{11}$ and the distance from the point $\beta_{12}$ is $r_1:r_2$, as the corresponding point of the point $\alpha_x$.

Next, a description is given of a flow of the corresponding point estimating process performed by the corresponding point estimating part 514. FIG. 13 is a flowchart of the corresponding point estimating process performed by the corresponding point estimating part 514.

In step S1301, the corresponding point estimating part 514 sequentially reads the feature points of the comparison source CT image 401, which are determined as not having a corresponding point, as the feature points to be processed from the corresponding vector DB 522.

In step S1302, the corresponding point estimating part 514 reads closest feature points as reference points from the corresponding vector DB 522, which feature points are on a straight line passing through the point to be processed ($\alpha_x$) and opposite to each other with the feature point to be processed interposed therebetween.

In step S1303, the corresponding point estimating part 514 calculates the ratio ($r_1:r_2$) of the distances to the reference points ($\alpha_{11}$, $\alpha_{12}$) read in step S1302 from the feature point to be processed.

In step S1304, the corresponding point estimating part 514 searches the corresponding vector DB 522 and specifies a feature point of the comparison source CT image 413 corresponding to each of the reference points ($\alpha_{11}$, $\alpha_{12}$).

In step S1305, the corresponding point estimating part 514 acquires a straight line passing through the feature points ($\beta_{11}$, $\beta_{12}$) corresponding to the reference points ($\alpha_{11}$, $\alpha_{12}$), which are specified in step S1304. Additionally, the corresponding point estimating part 514 calculates a point on the acquired straight line for which a ratio of distances from the feature points corresponding to the reference points is equal to the ratio ($r_1:r_2$) of the distances calculated in step 1303. Further, the corresponding point estimating part 514 determines the calculated point ($\beta_x$) to be a corresponding point of the feature point to be processed.

In step S1306, the corresponding point estimating part 514 stores the corresponding point determined in step S1305 as the corresponding point of the feature point to be processed in the corresponding vector DB 522.

In step S1307, the corresponding point estimating part 514 determines whether the corresponding point estimating process is performed with respect to all feature points of the comparison source CT image 401 each of which is determined as not having a corresponding point. If it is determined, in step S1307, that there is a feature point for which the corresponding point estimating process is not performed, the process proceeds to step S1301 to perform the process of step S1301 to step S1306 with a feature point subsequent to the feature point determined as not having a corresponding point.

On the other hand, if it is determined, in step S1307, that the corresponding point estimating process has been performed for all feature points which are determined as not having a corresponding point, the corresponding point estimating process is ended.

As mentioned above, the image display apparatus 120 according to the present embodiment estimates a corresponding point based on a ratio of distances from two reference points. Thus, a corresponding point can be estimated with a smaller amount of calculation than a case where a corresponding point is determined after calculating a similarity between feature amounts of feature points by performing a feature point matching process.

Specifically, the image display apparatus 120 according to the present embodiment determines a corresponding point with high accuracy by performing the feature point matching process with respect to a feature point having a large brightness difference such as a body surface and organs (lungs and heart) of a patient. Additionally, the image display apparatus 120 according to the present embodiment reduces an amount of calculation by estimating a corresponding point based on the ratio of the distances by using the corresponding point determined with high accuracy by performing the feature point matching process with respect to a feature point having a small brightness difference such as an interior of a lung or heart of a patient.

Thus, the image display apparatus 120 of the present embodiment can achieve highly accurate positioning with a less amount of calculation.

Figure 14:
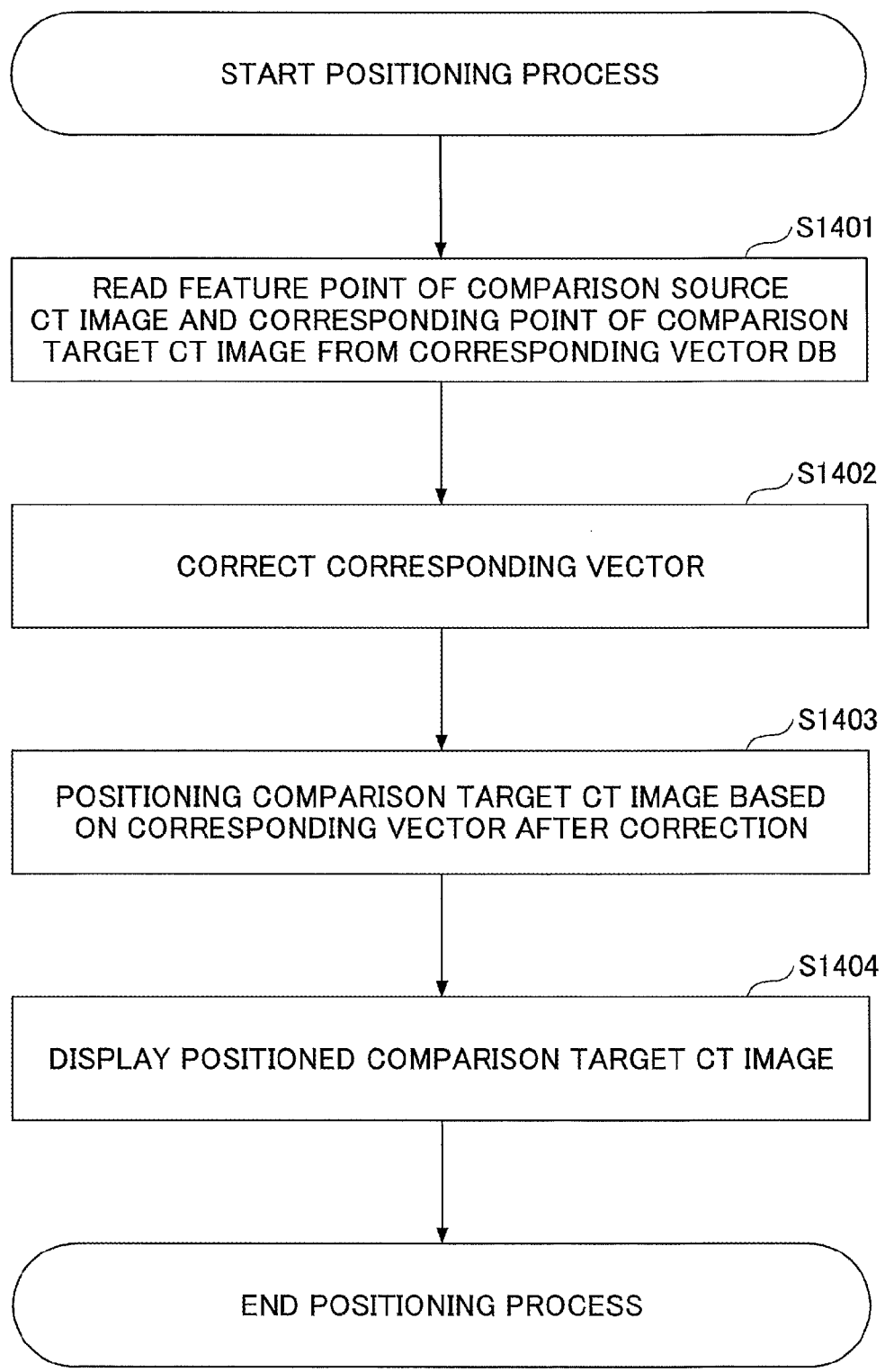
FIG. 14 is a flowchart of a positioning process performed by a positioning processing part.

Next, a description is given of a function of the positioning processing part 515 among functions for the local-area positioning by the image display apparatus 120. FIG. 14 is a flowchart of a positioning process performed by the positioning processing part 515.

In step S1401, the positioning processing part 515 reads the feature point of the comparison source CT image 401 and the corresponding point of the comparison target CT image 413 corresponding to the feature point of the comparison source CT image 401 that are stored in the corresponding vector DB 522.

In step S1402, the positioning processing part 515 calculates a corresponding vector defined by the feature point and corresponding point that are read in step S1401. Additionally, the positioning processing part 515 determines a destination of each feature point of the comparison target CT image 413 based on the calculated corresponding vector. At this time, the positioning processing part 515 performs a correcting process so that the comparison target CT image 413 after moving the feature points becomes a smooth image (that is, correcting the corresponding vector)

In step S1403, the positioning processing part 515 performs positioning of each pixel of the comparison target CT image 413 based on the corrected corresponding vector. In step S1404, the positioning processing part 515 displays the positioned comparison target CT image on the displaying part 206.

Next, a description is given of a function of the display controlling part 516, which is a function for performing a display control by the image display apparatus 120. The display controlling part 516 performs a display control for enabling easy comparison between the comparison source CT image 401 and the comparison target CT image 413, which has been subjected to the positioning by the positioning processing part 515, that are displayed side by side (laterally).

Figure 15A:
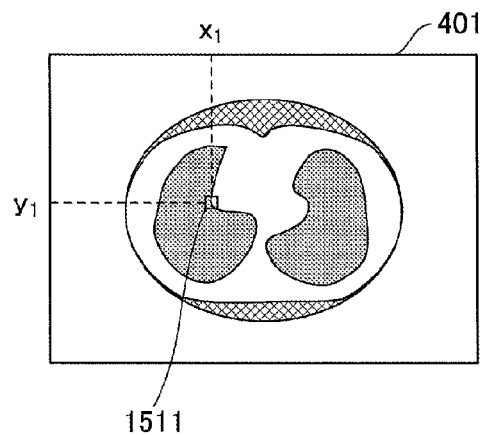
FIGS. 15A through 15D are illustrations of a first display example of CT images that are taken in different time periods.
Figure 15B:
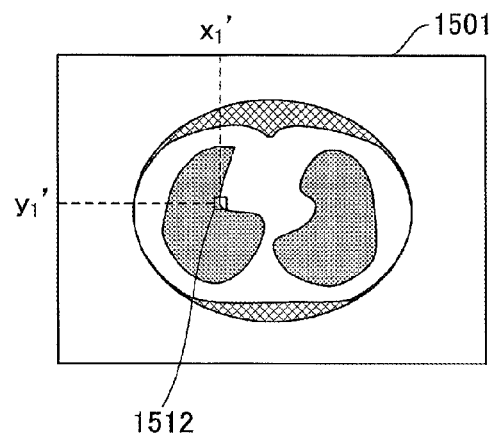
Figure 15C:
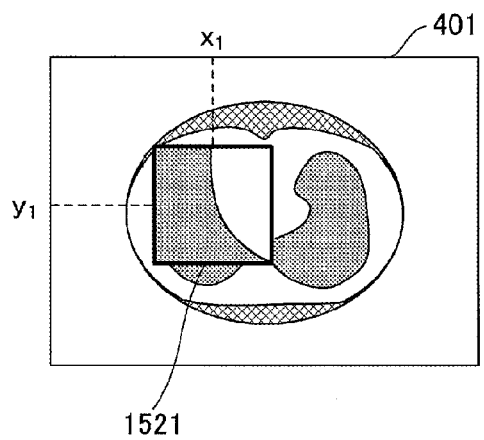
Figure 15D:
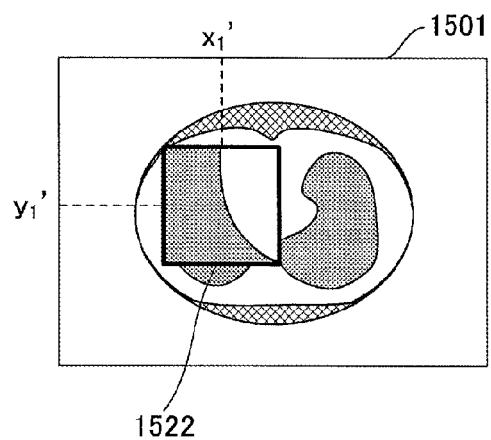

FIGS. 15A through 15D are illustrations of a first display example of CT images taken in different time periods. FIGS. 15A and 15C illustrate the comparison source CT image 401. FIGS. 15B and 15D illustrate the comparison target CT image 1501 on which the positioning has been performed by the positioning controlling part 515.

Here, FIG. 15A illustrates a state where a point 1511 on the coordinates $(x_1, y_1)$ is designated as a target point by a medical practitioner such as a doctor on the displayed comparison source CT image 401. When the display controlling part 516 detects the designation of the point 1511 on the displayed comparison source CT image 401, the display controlling part 516 identifies the coordinates of the designated point 1511. Further, the display controlling part 516 automatically displays a point 1512 on the comparison target CT image 1501 corresponding to the designated point 1511 as a target point on the comparison target CT image 1501.

As mentioned above, a correction of the corresponding vector is performed in the positioning process performed by the positioning processing part 515. Accordingly, the point 1512 on the comparison destination CT image 1501 corresponding to the point 1511 on the comparison source CT image 401 cannot be the same coordinates as the coordinates of the point 1511 on the comparison source CT image 401. Thus, the display controlling part 516 designates the coordinates $(x_1', y_1')$ on the comparison target CT image 1501 to which the correction of the corresponding vector is reflected.

FIG. 15C illustrates a state where an instruction of enlarging and displaying (enlarge-displaying) an area 1521 containing the designated point 1511 is input by a medical practitioner such as a doctor. When the display controlling part 516 detects that the instruction of enlarge-displaying the area 1521, the display controlling part 516 automatically enlarges and displays (enlarge-displays) an area 1522 corresponding to the area 1521 on the comparison target CT image 1501.

As mentioned above, in a state where the comparison source CT image 401 and the comparison target CT image 1501, which are taken in different time periods, are displayed simultaneously side by side, if a point on one of the CT images is designated as a target point, the display controlling part 516 automatically designates a point on the other CT image as a target point. Additionally, if an instruction of enlarge-display is input with respect to an area containing a point on the one of the CT images, an area containing the corresponding point on the other CT image is automatically enlarged and displayed (enlarge-displayed). Thus, a medical practitioner such as a doctor can easily grasp a position corresponding to the target point, and can easily compare the CT images to know how the lesion has changed.

Figure 16:
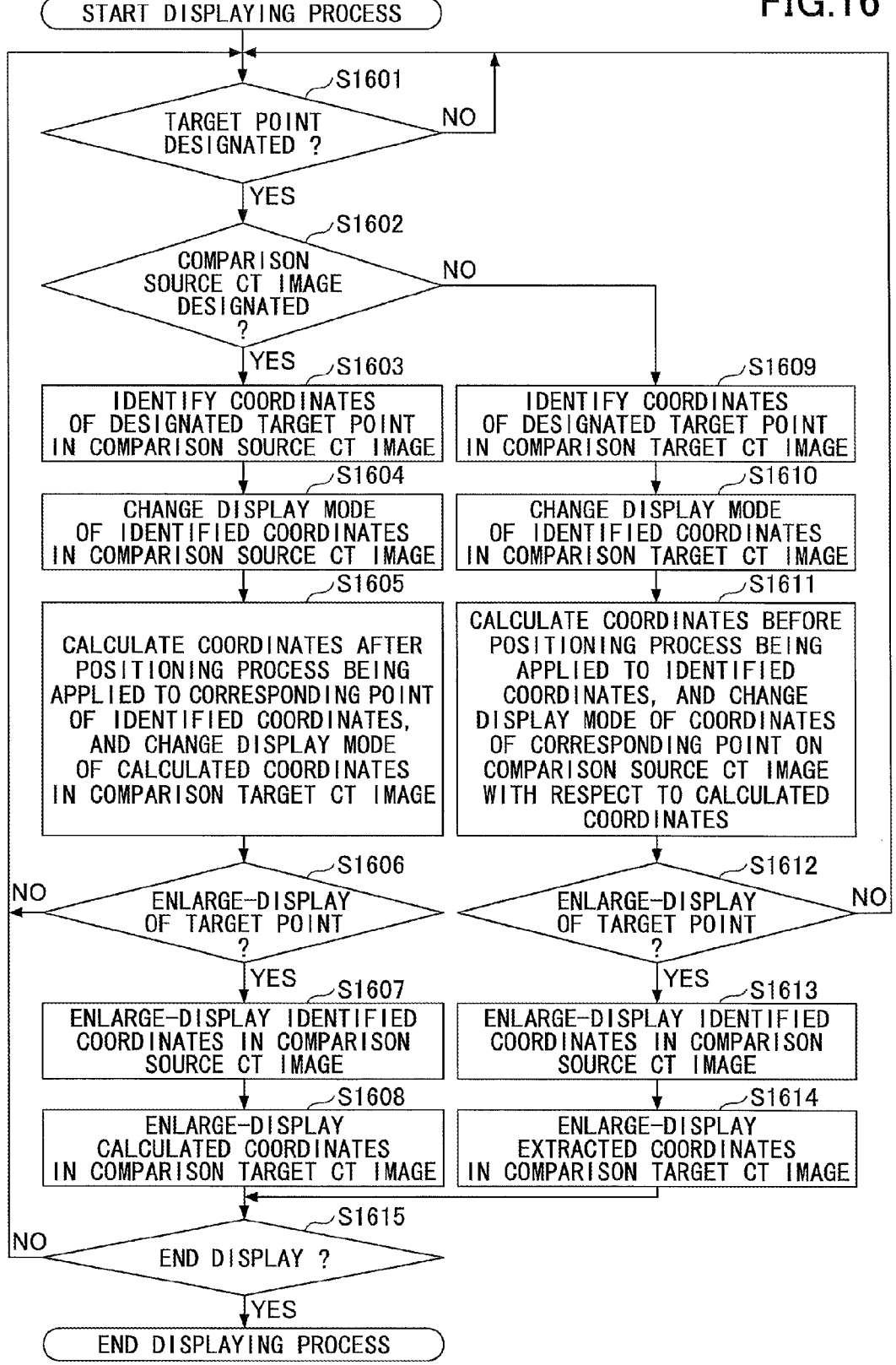
FIG. 16 is a flowchart of a first displaying process performed by a display controlling part.

Next, a description is given of a flow of a displaying process performed by the display controlling part 516. FIG. 16 is a flowchart of a first displaying process performed by the display controlling part 516. When performing the process according the flowchart illustrated in FIG. 16, it is assumed that the comparison source CT image 401 and the comparison target CT image 1501 are displayed on the displaying part 206 side by side.

In step S1601, the display controlling part 516 determines whether a target point is designated by a medical practitioner such as a doctor. If it is determined, in step S1601, that there is no designation of a target point, the display controlling part 516 waits for a determination of the designation of a target point.

On the other hand, if it is determined, in step S1601, that a target point is designated, the process proceeds to step S1602. In step S1602, the display controlling part 516 determines whether the designation of the target point is performed on the comparison source CT image.

If it is determined, in step S1602, that the designation of the target point is performed on the comparison source CT image, the process proceeds to step S1603. In step S1603, the display controlling part 516 identifies the coordinates of the designated target point.

In step S1604, the display controlling part 516 changes the display mode of the coordinates identified in the comparison source CT image 401.

In step S1605, the display controlling part 516 reads the corresponding point of the identified coordinates from the corresponding vector DB 522, and calculates the coordinates of the read corresponding point after the positioning process by the positioning processing part 515 is performed on the read corresponding point. Further, the display controlling part 516 changes the display mode of the calculated coordinates in the comparison target CT image 1501.

In step S1606, the display controlling part 516 determines whether an instruction of enlarge-display of the target point is input by the medical practitioner such as a doctor. If it is determined, in step S1606, that the instruction of enlarge-display of the target point is not input, the process returns to step S1601.

On the other hand, if it is determined, in step S1606, that the instruction of enlarge-display of the target point is input, the process proceeds to step S1607. In step S1607, the display controlling part 516 enlarges and displays (enlarge-displays) a predetermined area containing the identified coordinates in the comparison source CT image 401.

Then, in step S1608, the display controlling part 516 enlarge-displays a predetermined area containing the calculated coordinates in the comparison target CT image 1501.

On the other hand, if it is determined, in step S1602, that the designation of the target point is performed on the comparison target CT image 1501, the process proceeds to step S1609. In step S1609, the display controlling part 516 identifies the coordinates of the designated target point.

In step S1610, the display controlling part 516 changes the display mode of the identified coordinates in the comparison target CT image 1501.

In step S1611, the display controlling part 516 calculates the coordinates of the identified coordinates before the positioning process by the positioning processing part 515 is performed, and extracts the coordinates of the corresponding point on the comparison source CT image 401 with respect to the identified coordinates. Further, the display controlling part 516 changes the display mode of the extracted coordinates in the comparison source CT image 401.

Then, the display controlling part 516 determines, in step S1612, whether an instruction of enlarge-display of the target point is input by the medical practitioner such as a doctor. If it is determined, in step S1612, that the instruction of enlarge-display of the target point is not input, the process returns to step S1601.

On the other hand, if it is determined, in step S1612, that the instruction of enlarge-display of the target point is input, the process proceeds to step S1613. In step S1613, the display controlling part 516 enlarge-displays a predetermined area containing the identified coordinates in the comparison target CT image 1501.

Then, in step S1614, the display controlling part 516 enlarge-displays a predetermined area containing the extracted coordinates in the comparison source CT image 401.

The display controlling part 516 determines, in step S1615, whether an instruction of ending the displaying process is input. If it is determined, in step S1615, that the instruction of ending the displaying process is not input, the process returns to step S1601. On the other hand, if it is determined that the instruction of ending the displaying process is input, the displaying process is ended.

As mentioned above, the image display apparatus 120 according to the present embodiment performs, when displaying CT images, which are taken in different time periods, as a comparison source CT image and a comparison target CT image side by side, the large-area positioning and local-area positioning with respect to the comparison source CT image. Additionally, when performing the local-area positioning, the image display apparatus 120 according to the present embodiment calculates the feature point of the comparison target CT image corresponding to the feature point of the comparison source CT image as a corresponding point. Further, when there is no corresponding point of the feature point of the comparison source CT image, the image display apparatus 120 according to the present embodiment estimates a corresponding point by using a feature point, which is in a peripheral edge in the vicinity of the feature point of the comparison source CT image and located at an opposite position. Additionally, the image display apparatus 120 according to the present embodiment performs the local-area positioning of the comparison target CT image by using the calculated corresponding point and the estimated corresponding point. Moreover, if a target point is designated in one of the comparison source CT image and the comparison target CT image, which are displayed side by side, the image display apparatus 120 according to the present embodiment automatically designates the target point at the corresponding position in the other. Furthermore, if an instruction is made to enlarge-display an area containing the target point in one of the comparison source CT image and the comparison target CT image, which are displayed side by side, the image display apparatus 120 according to the present embodiment automatically enlarge-displays an area containing the corresponding point in the other.

Thereby, a medical practitioner such as a doctor can easily compare the CT images to know how the lesion designated in one of the CT images has changed with passage of time. Additionally, the local-positioning can be achieved with a less amount of calculation.

Second Embodiment

A description is given below of a second embodiment. In the second embodiment, when displaying the comparison source CT image and the comparison target CT image side by side, the display controlling part 516 uses, as the comparison target CT image, a CT image for which the large-area positioning and local-area positioning have not been performed.

Figure 17A:
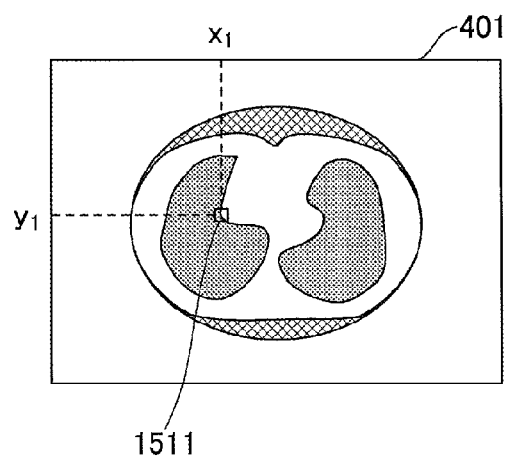
FIGS. 17A through 17D are illustrations of a second display example of the CT images that are taken in different time periods.
Figure 17B:
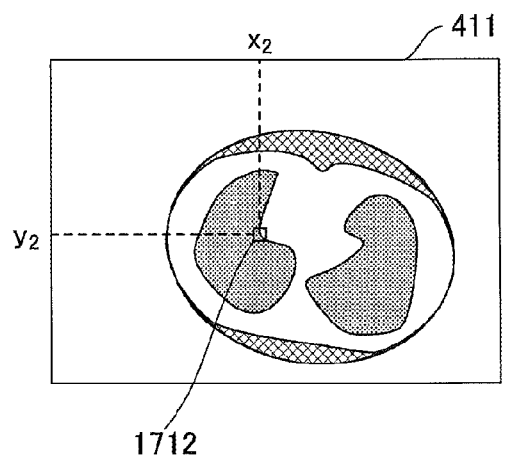
Figure 17C:
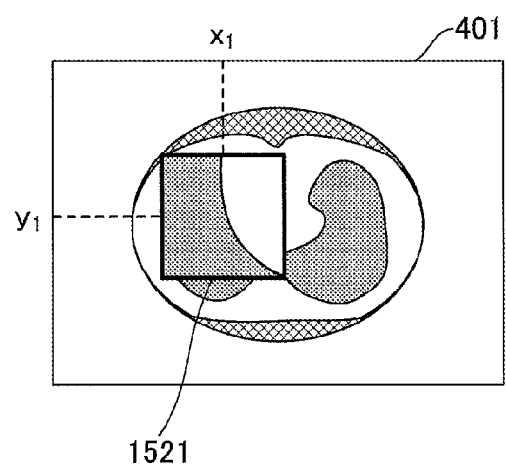
Figure 17D:
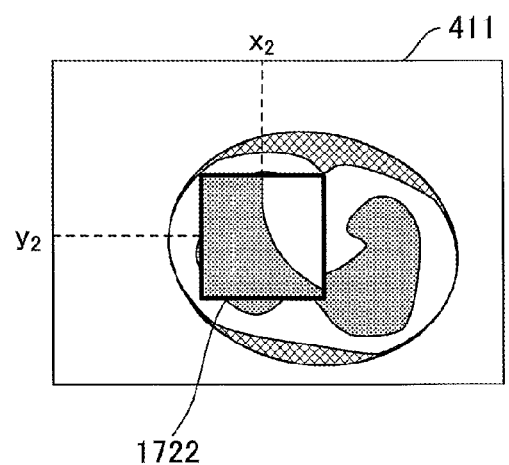

FIGS. 17A through 17D are illustrations of a second display example of CT images taken in different time periods. FIGS. 17A and 17C illustrate the comparison source CT image 401. FIGS. 17B and 17D illustrate the comparison target CT image 401 before the large-area positioning and the local-area positioning are performed.

Here, FIG. 17A illustrates a state where a point 1511 on the coordinates $(x_1, y_1)$ is designated as a target point by a medical practitioner such as a doctor on the displayed comparison source CT image 401. When the display controlling part 516 detects the designation of the point 1511 on the displayed comparison source CT image 401, the display controlling part 516 identifies the coordinates of the designated point 1511. Further, the display controlling part 516 automatically displays a point 1712, which is on the comparison target CT image 411 corresponding to the designated point 1511, on the comparison target CT image 411.

Because the comparison target CT image 411 is an image for which the large-area positioning and the local-area positioning have not been performed, the display controlling part 516 derives a corresponding point corresponding to the point 1511 by referring to the corresponding vector DB 522. The corresponding point derived by referring to the corresponding vector DB 522 is a point on the comparison target CT image 413 for which the large-area positioning is performed. Thus, the display controlling part 516 further converts the derived corresponding point into a point before the large-area positioning is performed. The thus-acquired point 1712 (coordinates $(X_2, y_2)$) is displayed on the comparison target CT image 411. That is, the display controlling part 516 automatically designates the coordinates $(X_2, y_2)$ on the comparison target CT image 411.

FIG. 17C illustrates a state where an instruction of enlarging and displaying (enlarge-displaying) the area 1521 containing the designated point 1511 is input by a medical practitioner such as a doctor. When the display controlling part 516 detects that the instruction of enlarge-displaying the area 1521, the display controlling part 516 automatically enlarges and displays (enlarge-displays) an area 1722 corresponding to the area 1521 on the comparison target CT image 411.

As mentioned above, in a state where the comparison source CT image 401 and the comparison target CT image 411, which are taken in different time periods, are displayed laterally side by side, if a point on one of the CT images is designated, the display controlling part 516 automatically designates a point on the other CT image. Additionally, if an instruction of enlarge-display is input with respect to an area containing a point on one of the CT images, an area containing the corresponding point on the other CT image is automatically enlarged and displayed (enlarge-displayed). Thus, a medical practitioner such as a doctor can easily grasp a position corresponding to the designated point, and can easily compare the CT images to know how the lesion has changed.

Figure 18B:
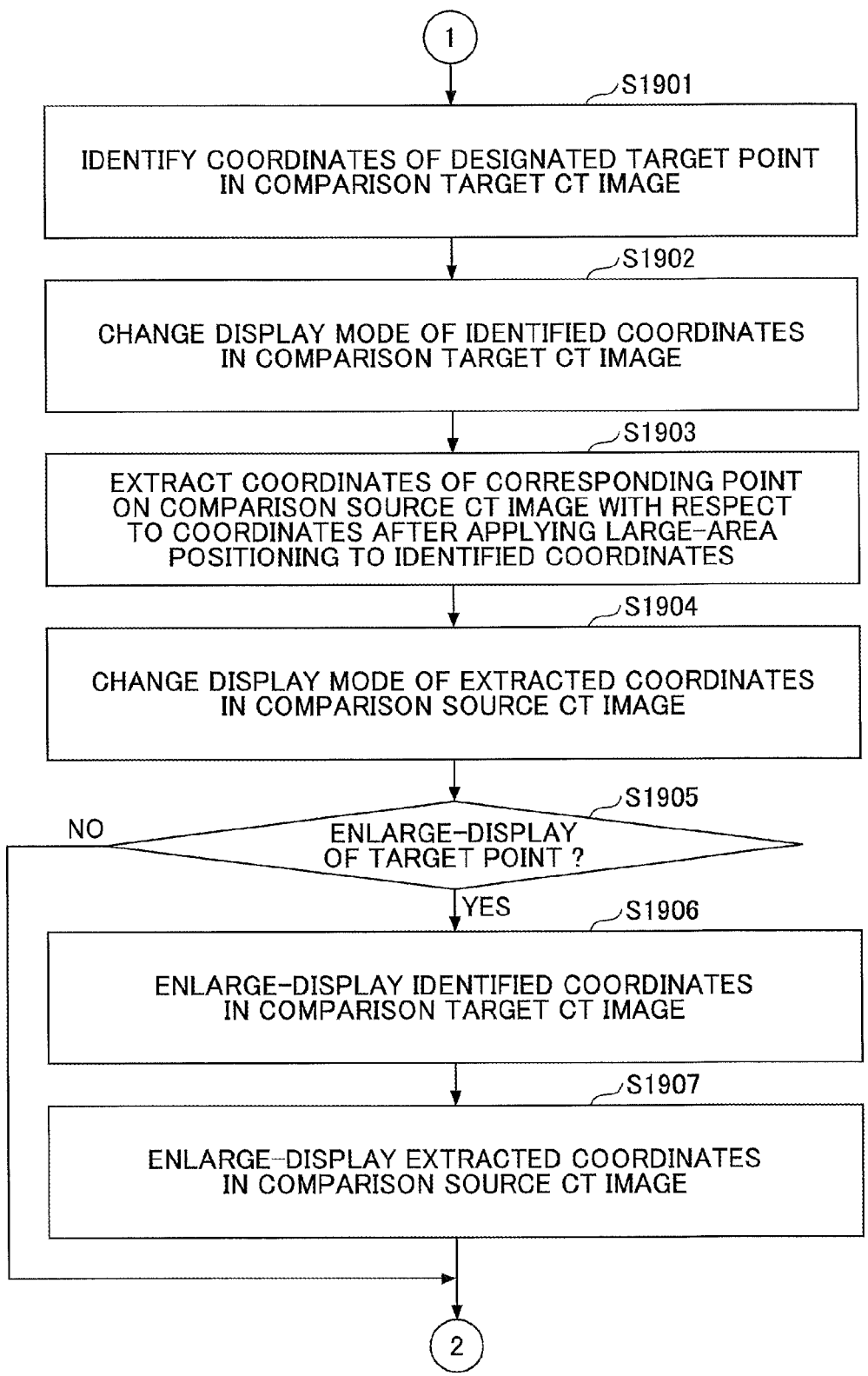
FIG. 18B is another part of the flowchart of the second displaying process performed by the display controlling part.

Next, a description is given of a flow of a displaying process performed by the display controlling part 516. FIGS. 18A and 18B are parts of a flowchart of a second displaying process performed by the display controlling part 516. When performing the process according the flowchart illustrated in FIGS. 18A and 18B, it is assumed that the comparison source CT image 401 and the comparison target CT image 411 are displayed on the displaying part 206 laterally side by side. Additionally, it is assumed that the large-area positioning program 141 and the local-area positioning program 142 are executed with respect to the comparison target CT image 411, and the corresponding point information 1100 is stored in the corresponding vector DB 522.

In step S1801, the display controlling part 516 determines whether a target point is designated by a medical practitioner such as a doctor. If it is determined, in step S1801, that there is no designation of a target point, the display controlling part 516 waits for a determination of the designation of a target point.

On the other hand, if it is determined, in step S1801, that a target point is designated, the process proceeds to step S1802. In step S1802, the display controlling part 516 determines whether the designation of the target point is performed on the comparison source CT image.

If it is determined, in step S1802, that the designation of the target point is performed on the comparison source CT image, the process proceeds to step S1803. In step S1803, the display controlling part 516 identifies the coordinates of the designated target point.

In step S1804, the display controlling part 516 changes the display mode of the coordinates identified in the comparison source CT image 401.

In step S1805, the display controlling part 516 extracts coordinates of the corresponding point on the comparison target CT image 411 corresponding to the identified coordinates by referring to the corresponding vector DB 255. Additionally, the display controlling part 516 converts the coordinates of the extracted corresponding point into the coordinates before the large-area positioning being performed.

In step S1806, the display controlling part 516 changes the display mode of the coordinates converted in step S1805 on the comparison target CT image 411.

Then, in step S1807, the display controlling part 516 determines whether an instruction of enlarge-display of the target point is input by the medical practitioner such as a doctor. If it is determined, in step S1807, that the instruction of enlarge-display of the target point is not input, the process returns to step S1810.

On the other hand, if it is determined, in step S1807, that the instruction of enlarge-display of the target point is input, the process proceeds to step S1808. In step S1808, the display controlling part 516 enlarges and displays (enlarge-displays) a predetermined area containing the identified coordinates in the comparison source CT image 401.

Then, in step S1809, the display controlling part 516 enlarge-displays a predetermined area containing the calculated coordinates in the comparison target CT image 411.

In step S1810, the display controlling part 516 determines whether an instruction of ending the displaying process is input. If it is determined that an instruction of ending the displaying process is not input, the process returns to step S1801.

On the other hand, if it is determined, in step S1802, that the designation of the target point is performed on the comparison target CT image 411, the process proceeds to step S1901.

In step S1901, the display controlling part 516 identifies the coordinates of the designated target point. In step S1902, the display controlling part 516 changes the display mode of the identified coordinates in the comparison target CT image 411.

In step S1903, the display controlling part 516 calculates the coordinates of the identified coordinates after the large-area positioning being performed. Additionally, the display controlling part 516 extracts the coordinates of the corresponding point on the comparison source CT image 401, which coordinates correspond to the coordinates after the large-area positioning being performed, by referring to the corresponding vector DB 522.

In step S1904, the display controlling part 516 changes the display mode of the coordinates on the comparison source CT image 401, which is extracted in step S1903.

Then, the display controlling part 516 determines, in step S1905, whether an instruction of enlarge-display of the target point is input by the medical practitioner such as a doctor. If it is determined, in step S1905, that the instruction of enlarge-display of the target point is not input, the process returns to step S1810.

On the other hand, if it is determined, in step S1905, that the instruction of enlarge-display of the target point is input, the process proceeds to step S1906. In step S1906, the display controlling part 516 enlarge-displays a predetermined area containing the identified coordinates in the designated comparison target CT image 411.

Then, in step S1907, the display controlling part 516 enlarge-displays a predetermined area containing the extracted coordinates in the comparison source CT image 401.

The display controlling part 516 determines, in step S1810, whether an instruction of ending the displaying process is input. If it is determined, in step S1810, that the instruction of ending the display process is input, the displaying process is ended.

As mentioned above, according to the present embodiment, even in a case where the comparison source CT image 401 and the comparison target CT image 411 are displayed laterally side by side, when a target point is designated in one of the CT images, the target point can be automatically designated at a corresponding position in the other CT image. Additionally, when enlarge-display of an area containing the target point in one of the CT images is instructed, an area containing the corresponding point can be automatically enlarge-displayed in the other CT image.

As a result, a medical practitioner such as a doctor who uses the image display apparatus according to the present embodiment can easily compare the CT images to check how the lesion designated in one of the CT images has changed with passage of time.

Third Embodiment

In each of the above-mentioned embodiments, any method may be applicable to match CT images from among a plurality of CT images taken along a body axis of a patient. For example, if a plurality of CT images are taken along the body axis from the head toward the legs of a patient, the CT images of the same position from the head (the same number of picture films exist from the head image to the CT image to be compared) may be match for comparison.

Additionally, although the image display apparatus 120 includes the large-area positioning program 141, local-area positioning program 142 and synchronization display program 143 in each of the above-mentioned embodiments, the image display apparatus 120 may include only the synchronization display program 143. In such a case, other programs may be installed in a server apparatus provided separately from the image display apparatus 120.

Further, although the x-ray CT images are used in each of the above-mentioned embodiments, the image display apparatus is applicable to a case where medical CT images other than the x-ray CT images, such as MRI (Magnetic Resonance Imaging) images, are displayed.

Further, although the CT images are displayed simultaneously side by side (laterally close to each other) for comparison in the above-mentioned embodiments, the CT images may be displayed simultaneously by being arranged vertically or diagonally close to each other for comparison.

All examples and conditional language recited herein are intended for pedagogical purposes to aid the reader in understanding the principles of the invention and the concepts contributed by the inventor to furthering the art, and are to be construed a being without limitation to such specifically recited examples and conditions, nor does the organization of such examples in the specification relates to a showing of the superiority and inferiority of the invention. Although the embodiment(s) of the present invention (s) has(have) been described in detail, it should be understood that the various changes, substitutions, and alterations could be made hereto without departing from the spirit and scope of the invention.

What is claimed is:

1. An image display apparatus, comprising:
   a display device configured to display a first image and a second image simultaneously, the first image and the second image representing the same object taken in different time periods; and
   a processor configured to execute a program to perform a process including
      displaying the first and second images simultaneously on the display device according to a first display mode;
      determining a target portion designated in the first image;
      changing a display mode of a corresponding portion of the second image from the first display mode to a second display mode, the corresponding portion of the second image corresponding to the target portion designated in the first image;
      identifying a peripheral edge of a predetermined part in each of the first and second images;
      determining opposite two points on the peripheral edge in the first image, the two points being positioned on a straight line passing through a designated point designated in the first image;
      calculating feature amounts of each point on each of the peripheral edges in the first and second images;
      identifying two points on the peripheral edge corresponding to the two points on the peripheral edge of the first image from among points on the peripheral edge in the second image based on the feature amounts of each point on the peripheral edges in the first and second images;
      identifying distances from the designated point in the first image to each of the two points determined in the first image; and
      identifying in the second image a point satisfying a ratio of the identified distances.

2. The image display apparatus as claimed in claim 1, wherein the processor performs the process further including
   determining a correspondence relationship between a plurality of points contained in the first image and a plurality of points contained in the second image based on feature amounts calculated according to brightness values of pixels in a predetermined area containing the respective points.

3. The image display apparatus as claimed in claim 2, wherein the processor performs the process further including
   estimating, when a corresponding point contained in the second image, corresponding to a target point contained in the first image, is not determined by the determining the correspondence relationship, the corresponding point contained in the second image.

4. The image display apparatus as claimed in claim 3, wherein the processor performs the process further including
   calculating a point corresponding to the designated point designated in the first image based on the corresponding point determined by the determining the correspondence relationship or the corresponding point estimated by the estimating, and displaying the calculated point in the second image according to the second display mode different from the first display mode.

5. The image display apparatus as claimed in claim 1, wherein the processor performs the process further including
   displaying the first and second images simultaneously close to each other after positioning the second image to match the first image.

6. The image display apparatus as claimed in claim 1, wherein the second display mode is an enlarge-display mode according to which the corresponding portion of the second image is enlarged and displayed in the second image.

7. The image display apparatus as claimed in claim 1, wherein the first and second images are medical images.

8. The image display apparatus as claimed in claim 7, wherein the medical images are CT (Computed Tomography) images or MRI (Magnetic Resonance Imaging) images.

9. An image display apparatus comprising:
   a memory configured to store a program; and
   a processor configured to execute the program to perform an image displaying process including
      identifying a peripheral edge of a predetermined part in each of two images that are taken in different time periods;
      determining opposite two points on the peripheral edge in one of the two images, the two points being positioned on a straight line passing through a designated point designated in the one of the images;
      identifying two points on the peripheral edge corresponding to the two points on the peripheral edge of the one of the two images from among points on the peripheral edge in the other of the two images based on feature amounts of each point on the peripheral edges in the two images;
      identifying distances from the designated point in the one of the two images to each of the two points determined in the one of the two images; and
      identifying in the other of the two images a point satisfying a ratio of the identified distances.

10. The image display apparatus as claimed in claim 9, wherein the two images are medical images.

11. The image display apparatus as claimed in claim 10, wherein the medical images are CT (Computed Tomography) images or MRI (Magnetic Resonance Imaging) images.

12. An image display method of displaying a first image and a second image simultaneously, the first image and the second image representing the same object taken in different time periods, the image display method comprising:
- displaying, by a computer, the first and second images simultaneously on a display device according to a first display mode;
- determining, by the computer, a target portion designated in the first image;
- changing, by the computer, a display mode of a corresponding portion of the second image from the first display mode to a second display mode, the corresponding portion of the second image corresponding to the target portion designated in the first image;
- identifying, by the computer, a peripheral edge of a predetermined part in each of the first and second images;
- determining, by the computer, opposite two points on the peripheral edge in the first image, the two points being positioned on a straight line passing through a designated point designated in the first image;
- calculating, by the computer, feature amounts of each point on each of the peripheral edges in the first and second images;
- identifying, by the computer, two points on the peripheral edge corresponding to the two points on the peripheral edge of the first image from among points on the peripheral edge in the second image based on the feature amounts of each point on the peripheral edges in the first and second images;
- identifying, by the computer, distances from the designated point in the first image to each of the two points determined in the first image; and
- identifying, by the computer, in the second image, a point satisfying a ratio of the identified distances.

13. A non-transitory computer readable storage medium having stored therein a program which, when executed by the computer, causes the computer to perform the image display method as claimed in claim 12.

14. The image display method as claimed in claim 12, wherein the first and second images are medical images.

15. The image display method as claimed in claim 14, wherein the medical images are CT (Computed Tomography) images or MRI (Magnetic Resonance Imaging) images.

* * * * *